United States Patent
Brumley et al.

(10) Patent No.: US 11,879,971 B2
(45) Date of Patent: Jan. 23, 2024

(54) SMALL APERTURE ACOUSTIC VELOCITY SENSOR

(71) Applicant: Teledyne Instruments, Inc., Thousand Oaks, CA (US)

(72) Inventors: Blair H. Brumley, San Diego, CA (US); Jerker Taudien, Burlington, VT (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 323 days.

(21) Appl. No.: 17/131,033

(22) Filed: Dec. 22, 2020

(65) Prior Publication Data
US 2021/0181339 A1  Jun. 17, 2021

Related U.S. Application Data

(63) Continuation of application No. 15/221,388, filed on Jul. 27, 2016, now Pat. No. 10,877,151.
(Continued)

(51) Int. Cl.
*G01S 15/60* (2006.01)
*G01S 7/521* (2006.01)
*G01S 7/52* (2006.01)

(52) U.S. Cl.
CPC .............. *G01S 15/60* (2013.01); *G01S 7/521* (2013.01); *G01S 7/52003* (2013.01)

(58) Field of Classification Search
None
See application file for complete search history.

(56) References Cited

U.S. PATENT DOCUMENTS

4,088,978 A * 5/1978 Gilmour ............. G01S 15/8904
367/106
4,244,026 A * 1/1981 Dickey, Jr. ................ G01P 5/24
702/143
(Continued)

FOREIGN PATENT DOCUMENTS

EP   2 317 335 A1   5/2011
EP   2824479 A1 *   1/2015
(Continued)

OTHER PUBLICATIONS

Owen, Earle W. "Measurement of speed by cross correlation using pulse frequency signals." IEEE Transactions on Industrial Electronics and Control Instrumentation 2 (1978): 167-172. (Year: 1978).*
(Continued)

*Primary Examiner* — Isam A Alsomiri
*Assistant Examiner* — Jonathan D Armstrong
(74) *Attorney, Agent, or Firm* — Knobbe, Martens, Olson & Bear, LLP

(57) ABSTRACT

A small aperture acoustic velocity sensor and a method for velocity measurement are disclosed. In one aspect, the disclosed technology uses spatially-shifted sub-arrays for projection and/or hydrophone receipt and cross-correlation of successive pulses to improve correlation and reduce bias. The spatial shift can be created physically by selection of groups of elements or virtually by weighting the contributions of fixed sub-arrays. Spatial modulation can be used to form a projected signal and measured spatial phase of slope across the set of sub-arrays allows correction of both long- and short-term errors. The disclosed technology uses spatial and/or temporal interpolation.

22 Claims, 14 Drawing Sheets

Related U.S. Application Data

(60) Provisional application No. 62/199,838, filed on Jul. 31, 2015.

(56) References Cited

U.S. PATENT DOCUMENTS

| | | | |
|---|---|---|---|
| 4,635,240 A | | 1/1987 | Geohegan et al. |
| 4,779,243 A | * | 10/1988 | West ..................... B06B 1/0261 367/87 |
| 4,891,762 A | | 1/1990 | Chotiros |
| 4,953,143 A | * | 8/1990 | Higgins ................ G01S 15/102 367/88 |
| 5,033,030 A | | 7/1991 | Goodman |
| 5,079,555 A | * | 1/1992 | Turpin .................... G01S 7/481 342/25 A |
| 5,122,990 A | | 6/1992 | Deines et al. |
| 5,208,785 A | | 5/1993 | Brumley et al. |
| 5,295,118 A | * | 3/1994 | Gilmour ............. G01S 15/8904 367/88 |
| 5,315,562 A | | 5/1994 | Bradley et al. |
| 5,422,860 A | | 6/1995 | Bradley et al. |
| 5,483,499 A | | 1/1996 | Brumley et al. |
| 5,483,500 A | * | 1/1996 | Capell, Sr. .............. G01S 3/805 367/905 |
| 5,615,173 A | | 3/1997 | Lucey et al. |
| 5,623,928 A | * | 4/1997 | Wright ................ G01S 7/52026 73/633 |
| RE35,535 E | | 6/1997 | Brumley et al. |
| 5,663,930 A | * | 9/1997 | Capell, Sr. ............. G01S 15/89 367/905 |
| 5,667,373 A | * | 9/1997 | Wright ................ G01S 15/8979 600/443 |
| 5,675,550 A | * | 10/1997 | Ekhaus ................ G01S 13/904 342/179 |
| 5,808,967 A | | 9/1998 | Yu et al. |
| 5,923,617 A | | 7/1999 | Thompson et al. |
| 5,930,201 A | | 7/1999 | Cray |
| 6,046,683 A | * | 4/2000 | Pidwerbetsky .......... H04B 1/40 342/51 |
| 6,052,334 A | | 4/2000 | Brumley |
| 6,198,765 B1 | * | 3/2001 | Cahn ..................... G01C 22/00 370/335 |
| 6,571,014 B1 | * | 5/2003 | Larkin ................ G06V 40/1347 382/125 |
| 6,781,540 B1 | * | 8/2004 | MacKey ................. G01S 13/90 342/25 A |
| 7,007,555 B2 | | 3/2006 | Strong |
| 7,242,638 B2 | | 7/2007 | Kerfoot et al. |
| 7,295,492 B2 | | 11/2007 | Scoca et al. |
| 7,317,660 B2 | | 1/2008 | Brumley |
| 7,379,387 B2 | | 5/2008 | Strong |
| 7,542,374 B2 | | 6/2009 | Brumley et al. |
| 7,545,705 B2 | | 6/2009 | Brumley |
| 7,613,072 B2 | | 11/2009 | Lohrmann |
| 7,768,874 B2 | | 8/2010 | Strong |
| 7,839,720 B2 | | 11/2010 | Brumley et al. |
| 8,625,392 B2 | | 1/2014 | Brumley |
| 9,945,931 B2 | * | 4/2018 | Allen .................... G01S 19/48 |
| 10,877,151 B2 | | 12/2020 | Brumley et al. |
| 2004/0166478 A1 | | 8/2004 | Scoca et al. |
| 2005/0007882 A1 | | 1/2005 | Bachelor et al. |
| 2006/0155492 A1 | | 7/2006 | Strong |
| 2007/0025184 A1 | | 2/2007 | Scoca et al. |
| 2007/0159922 A1 | | 7/2007 | Zimmerman et al. |
| 2008/0080313 A1 | * | 4/2008 | Brumley .............. G01S 7/52003 73/170.13 |
| 2008/0080314 A1 | * | 4/2008 | Brumley ................. G01P 5/241 367/89 |
| 2008/0080315 A1 | * | 4/2008 | Vogt ......................... G01S 15/58 367/90 |
| 2008/0094940 A1 | | 4/2008 | Brumley |
| 2008/0239869 A1 | | 10/2008 | Lohrmann |
| 2009/0052282 A1 | | 2/2009 | Strong |
| 2009/0066562 A1 | * | 3/2009 | Altes .................... G01S 13/9029 342/25 F |
| 2009/0141779 A1 | * | 6/2009 | Murakami ............... G01S 19/22 375/150 |
| 2009/0238042 A1 | | 9/2009 | Hawkinson et al. |
| 2010/0014386 A1 | | 1/2010 | Thompson et al. |
| 2011/0007606 A1 | | 1/2011 | Curtis |
| 2011/0202278 A1 | | 8/2011 | Caute et al. |
| 2012/0039366 A1 | * | 2/2012 | Wood .................. G01S 13/0209 343/893 |
| 2012/0218140 A1 | * | 8/2012 | Bergeron ............. G01S 15/8997 342/25 A |
| 2014/0240166 A1 | * | 8/2014 | Cortambert .......... H01Q 3/2605 342/90 |
| 2016/0043465 A1 | * | 2/2016 | McDevitt ................ G01S 13/91 342/368 |
| 2016/0054444 A1 | | 2/2016 | Pinto |

FOREIGN PATENT DOCUMENTS

| | | | | |
|---|---|---|---|---|
| EP | 2824479 B1 | * | 7/2016 | |
| FR | 2822958 A1 | * | 10/2002 | ......... G01S 13/4463 |
| GB | 2072986 A | * | 10/1981 | ............. G01S 13/68 |
| JP | H10506802 A | | 7/1998 | |
| JP | 2006204923 A | * | 8/2006 | ......... G01S 15/8993 |
| JP | 4302718 | | 7/2009 | |
| JP | 2009535097 A | * | 10/2009 | |
| JP | 2016180720 A | * | 10/2016 | ............. G01S 13/22 |
| WO | WO-9516928 A1 | * | 6/1995 | ............. G01S 15/89 |
| WO | WO-2014091475 A1 | * | 6/2014 | ........... H01Q 21/296 |

OTHER PUBLICATIONS

Roy et al., Jul. 1989, ESPRIT—estimation of signal parameters via rotational invariance techniques, IEEE Transactions on Acoustics, Speech, and Signal Processing, 37(7):984-995.

Terray et al., Mar. 1999, Measuring waves and currents with an upward-looking ADCP, Proceedings of the IEEE Sixth Working Conference on Current Measurement, IEEE, pp. 66-71.

International Search Report and Written Opinion dated Oct. 20, 2016 for PCT Patent Application No. PCT/US16/44311 which corresponds in priority to above-identified subject U.S. application.

International Preliminary Report on Patentability dated Feb. 6, 2018 for PCT Application No. PCT/US2016/044311 filed Jul. 27, 2016.

European Extended Search Report dated Feb. 25, 2019 for Application No. EP 16833551.1, filed Jan. 25, 2018, which is EPO counterpart to this U.S. application.

Office Action for European Patent Application No. 16833551.1 dated Sep. 6, 2023 issued by the European Patent Office.

\* cited by examiner

SMALL APERTURE ACOUSTIC VELOCITY SENSOR

RELATED APPLICATIONS

This application is a continuation of U.S. patent application Ser. No. 15/221,388, filed on Jul. 27, 2016, and entitled "SMALL APERTURE ACOUSTIC VELOCITY SENSOR," which claims the benefit of U.S. Provisional Application No. 62/199,838, filed on Jul. 31, 2015, and entitled "SMALL APERTURE ACOUSTIC VELOCITY SENSOR," the disclosures of each of which are hereby incorporated by reference in their entireties.

BACKGROUND

Field

The disclosed technology relates to underwater acoustic measurement systems and, more particularly, to a small aperture acoustic velocity sensor (SAAVS).

Description of the Related Technology

Many new applications of Doppler velocity logs and profilers such as autonomous underwater vehicles (UAVs) and remotely operated vehicles (ROVs) have limited space available for acoustic transducers, but could benefit from higher-altitude measurements achievable by going to lower frequencies than now used in the Doppler velocity logs that fit in them, thus making wider beamwidth necessary. Wider beamwidth would also alleviate certain signal-to-noise ratio (SNR) problems that can arise with narrow acoustic beams at high speeds or in wavy environments. With present Doppler technology, increasing the beamwidth creates problems with increased bias, reduced correlation, and consequent increased velocity standard deviation at any particular speed. The disclosed technology overcomes these problems.

Like the disclosed technology, correlation velocity logs (CVLs) also use spatiotemporal correlation, and use a relatively small aperture and low frequency. However, CVLs, having only a single acoustic beam, can only use phase to measure one velocity component. They have specular returns near nadir that carry little or no information about horizontal velocity; that information is weighted toward the sides of the acoustic beam where the signal is weaker. The correlation peak of the return signal in lag space is relatively wide and the width varies stochastically, giving a relatively noisy and erratic measurement of horizontal velocity. CVLs have a very wide beamwidth requiring modeling of bottom backscatter with multiple parameters, can have low signal to noise ratio and high flow noise due to their cross-correlation of individual array elements, and do not make efficient use of the available aperture. Certain sidescan sonars, including synthetic aperture sonars (SASs), may employ CVL methods to help navigate vehicle trajectory and attitude during a sequence of pings from which a bottom image and/or bathymetric map is generated. This use of CVL methods shares at least some of the disadvantages listed above for CVLs.

Parametric sonar also uses a relatively small aperture and uses a relatively low frequency over most of the acoustic path. It has the disadvantages of large source level loss due to inefficient non-linear projector technology, and a difficult design tradeoff in the choice of interfering source frequencies between acoustic beam width and power density.

U.S. Pat. No. RE 35,535 discloses a broadband acoustic Doppler current profiler (ADCP). U.S. Pat. Nos. 5,315,562 and 5,422,860 each disclose aspects of correlation velocity logs. U.S. Pat. No. 5,808,967 discloses phased arrays. U.S. Pat. No. 7,542,374 discloses, for phased arrays, a method of removing substantially a bias related to the velocity component orthogonal to the face. U.S. Pat. No. 7,839,720 discloses use of coding to remove sidelobe coupling bias in phased array systems. U.S. Pat. No. 5,923,617 discloses blazed arrays.

SUMMARY OF CERTAIN INVENTIVE ASPECTS

The system, method, and computer-readable media of the invention each have several aspects, no single one of which is solely responsible for its desirable attributes. Without limiting the scope of this invention, some aspects will now be briefly discussed.

One aspect is a method of measuring velocity underwater using an underwater active sonar system. The system includes a plurality of transducer arrays, each transducer array including a plurality of sub-arrays, configured to spatially modulate and project a plurality of acoustic beams in different directions, receive and spatially demodulate a spatiotemporal pattern of acoustic signals corresponding to echoes of the projected acoustic beams from a plurality of scatterers while preserving the relative phase relationship of the backscattered acoustic signals. The system further includes a processor configured to separate received acoustic signals backscattered from different ones of the projected acoustic beams, linearly combine the received acoustic signals over a portion of the transducer arrays, and measure vehicle velocity and/or water velocity components. The method includes locating a bottom surface for each of the combined acoustic signals. The method further includes selecting data segments in the combined acoustic signals including echoes of the located bottom surface. The method further includes computing auto-correlations of the selected data segments for each sub-array at zero time lag and at least one other lag at or near which the combined acoustic signal repeats. The method further includes computing cross-correlations of the selected data segments among the sub-arrays at zero time lag and at least one other lag at or near which the combined acoustic signal repeats. The method further includes estimating velocity to resolve phase ambiguity. Estimating velocity includes computing a correlation coefficient as a function of interpolation parameters. Estimating velocity further includes finding a peak of the correlation coefficient with respect to the interpolation parameters. Estimating velocity further includes correcting the peak location for bias. Estimating velocity further includes estimating a horizontal velocity component. Estimating velocity further includes estimating a vertical velocity component. Estimating velocity further includes setting a velocity estimate based on the estimated horizontal and vertical velocity components. The method further includes computing the velocity at or near an optimal interpolation point. Computing velocity at or near an optimal interpolation point includes computing interpolation parameters corresponding to the velocity estimate. Computing velocity at or near an optimal interpolation point further includes calculating a phase at the peak location. Computing velocity at or near an optimal interpolation point further includes refining the velocity estimate from the phase calculated at the peak location.

In an embodiment, the method further includes applying beamforming processing to separate received acoustic signals.

In an embodiment, the method further includes fitting a parametric model to the amplitude and phase of an interference pattern of the received acoustic signals.

Another aspect is a method of method of measuring velocity underwater using an underwater active sonar system. The system includes a plurality of transducer arrays, each transducer array including a plurality of sub-arrays, configured to spatially modulate and project a plurality of acoustic beams in different directions, receive and spatially demodulate a spatiotemporal pattern of acoustic signals corresponding to echoes of the projected acoustic beams from a plurality of scatterers in the water while preserving the relative phase relationship of the backscattered acoustic signals. The system further includes a processor configured to separate received acoustic signals backscattered from different ones of the projected acoustic beams, linearly combine the received acoustic signals over a portion of the transducer arrays, and measure vehicle velocity and/or water velocity components. The method includes locating a bottom surface for each of the combined acoustic signals. The method further includes selecting data segments in the combined acoustic signals including echoes of the located bottom surface. The method further includes computing auto-correlations of the selected data segments for each sub-array at zero time lag and at least one other lag at or near which the combined acoustic signal repeats. The method further includes computing cross-correlations of the selected data segments among the sub-arrays at zero time lag and at least one other lag at or near which the combined acoustic signal repeats. The method further includes estimating velocity to resolve phase ambiguity. The method further includes computing the velocity at or near an optimal interpolation point.

Another aspect is an underwater active sonar system. The system includes a plurality of transducer arrays configured to spatially modulate and project a plurality of acoustic beams in different directions, receive and spatially demodulate a spatiotemporal pattern of acoustic signals corresponding to echoes of the projected acoustic beams from a plurality of scatterers in the water while preserving the relative phase relationship of the backscattered acoustic signals. The system further includes a processor configured to separate received acoustic signals backscattered from different ones of the projected acoustic beams, linearly combine the received acoustic signals over a portion of the transducer arrays, and measure vehicle velocity and/or water velocity components based on the linearly combined signals.

In an embodiment, the processor applies beamforming processing to separate received acoustic signals. In another embodiment, the processor fits a parametric model to the amplitude and phase of an interference pattern of the received acoustic signals.

In an embodiment, the processor measures vehicle velocity by backscattering sound off the bottom surface of a water body. In another embodiment, the processor measures vehicle velocity and/or water velocity by backscattering sound off volume scatterers within a water body.

In an embodiment, at least one of the transducer arrays projects a gated monotone pulse to produce a narrowband signal. In an embodiment, at least one of the transducer arrays projects one or more repetitions of a phase-coded or chirped signal to produce a wideband signal.

In an embodiment, the processor is further configured to interpolate received acoustic signals, in at least one of time and space, to approximate bistatic invariance and the Doppler-shifted pulse repetition interval.

In an embodiment, the processor uses the phase of a cross-correlation function at or near a lag equal to the Doppler-shifted pulse repetition interval or an integer multiple of that interval in multiple acoustic beams to measure velocity.

In an embodiment, each of the transducer arrays comprises at least one of a phased array, an array of phased arrays, a multichannel array, a blazed array, an array of blazed arrays, and a set of piston transducers. In an embodiment, the shape of each of the transducer array is approximately polygonal, a section of a circle, or a section of an oval.

Another aspect is an underwater active sonar system. The system includes a plurality of projection arrays configured to spatially modulate and project a plurality of acoustic beams in different directions. The system further includes a plurality of hydrophone arrays configured to receive and spatially demodulate a spatiotemporal pattern of acoustic signals corresponding to echoes of the projected acoustic beams from a plurality of scatterers while preserving the relative phase relationship of the backscattered acoustic signals from the scatterers. The system further includes a processor configured to separate received acoustic signals backscattered from different ones of the projected acoustic beams, linearly combine the received acoustic signals over a portion of the hydrophone arrays, and measure vehicle velocity and/or water velocity components based on the linearly combined signals.

Another aspect is an underwater active sonar system. The system includes means for spatially modulating a plurality of acoustic beams. The system further includes means for projecting the spatially modulated acoustic beams in different directions. The system further includes means for receiving a spatiotemporal pattern of acoustic signals corresponding to the echoes of projected acoustic beams from a plurality of scatterers in the water while preserving the relative phase relationship of the backscattered acoustic signals. The system further includes means for spatially demodulating the received spatiotemporal pattern of acoustic signals. The system further includes means for separating the received acoustic signals backscattered from different ones of the projected acoustic beams. The system further includes means for linearly combining the separated received acoustic signals over a portion of the receiving means. The system further includes means for measuring vehicle velocity and/or water velocity components based on the linearly combined signals.

Another aspect is a velocity-measuring device that uses the spatiotemporal pattern of backscattered acoustic signals. In an embodiment, the device includes a plurality of phased arrays to measure the spatiotemporal pattern. In an embodiment, the device includes a plurality of non-overlapping sub-arrays to measure the spatiotemporal pattern. In an embodiment, the device uses spatial modulation of an array to produced one or more acoustic beams at an angle to the normal to the array face.

Another aspect is a correlation velocity log with other than a vertical projected acoustic beam. In an embodiment, multiple slanted acoustic beams are projected simultaneously, sequentially, two-at-a time, or one-at-a-time. The projector(s) can be a phased array, an array of phased arrays, a multichannel array of individual elements, a multichannel array with one channel per stave, a blazed array, an array of blazed arrays, or a set of piston transducers. The hydrophone(s) can be the same transducers as the projector(s) or an independent set of transducers, such as an array of phased arrays, an array of switchable sub-elements, a multichannel array of individual elements, an array of blazed arrays, or multiple piston transducers. The hydrophone(s) can receive the echo return signal from a particular acoustic beam at any time and in any sequence relative to the projection of other acoustic beams and to the projection of similar pulses from the same acoustic beam. The velocity processing hardware and algorithm can either attempt to separate signals from individual acoustic beams or else measure and fit a model to the interference pattern created by the returns from multiple acoustic beams.

Another aspect relates to a correlation velocity log that uses phase information detecting motion along the acoustic beam axis of each of two or more acoustic beams to precisely measure two or three components of velocity.

Another aspect relates to a correlation velocity log that uses spatial modulation across an array to create an interference pattern across the correlation function in lag space, creating distinct small-scale features that can be more easily tracked to measure horizontal velocity than the broad smooth shape of the correlation function created by most CVLs.

Another aspect relates to a correlation velocity log for which correlations are done between combinations of signals from sub-arrays of elements rather than individual elements. The SNR is higher when signals are combined linearly before the non-linear cross- or auto-correlation step. Also, the correlation coefficient is higher when interpolation is performed before the non-linear correlation step, at least conceptually if not in order of completion of execution.

Another aspect relates to a Doppler velocity log for which correlations are done with a lag in both space and time, not in time alone.

Another aspect relates to a Doppler velocity log for which the spatial lag for each acoustic beam approximates that necessary to ensure that the bistatic invariance condition holds when projected along with the velocity vector onto the plane perpendicular to the acoustic beam axis.

Another aspect uses interpolation to create a virtual spatial and/or time shift at a spatial and/or time lag other than those at which measurements are made. Designing phased array transducers with selective switching of sub-arrays is difficult for both projection and receipt of acoustic signals for various practical reasons. Use of interpolation between independent adjacent portions of the phased array to create a virtual spatial sub-array shift when the full array is used for projection can give performance almost as good as when cross-correlating signals from overlapping physical sub-arrays.

Embodiments of the disclosed technology measure vehicle velocity in deep water. Other embodiments are configured for current profiling with either uniform or non-uniform depth cell sizes. Embodiments of the disclosed technology use echoes received between multiple pulses (often referred to as pulse-coherent or pulse-to-pulse coherent mode) or echoes received after the projected transmission is complete. Embodiments of the disclosed technology can project single or multiple gated sine waves, repeated phase codes or chirps with or without gaps, or any other repeated transmissions.

DETAILED DESCRIPTION OF CERTAIN EMBODIMENTS

Figure 1:
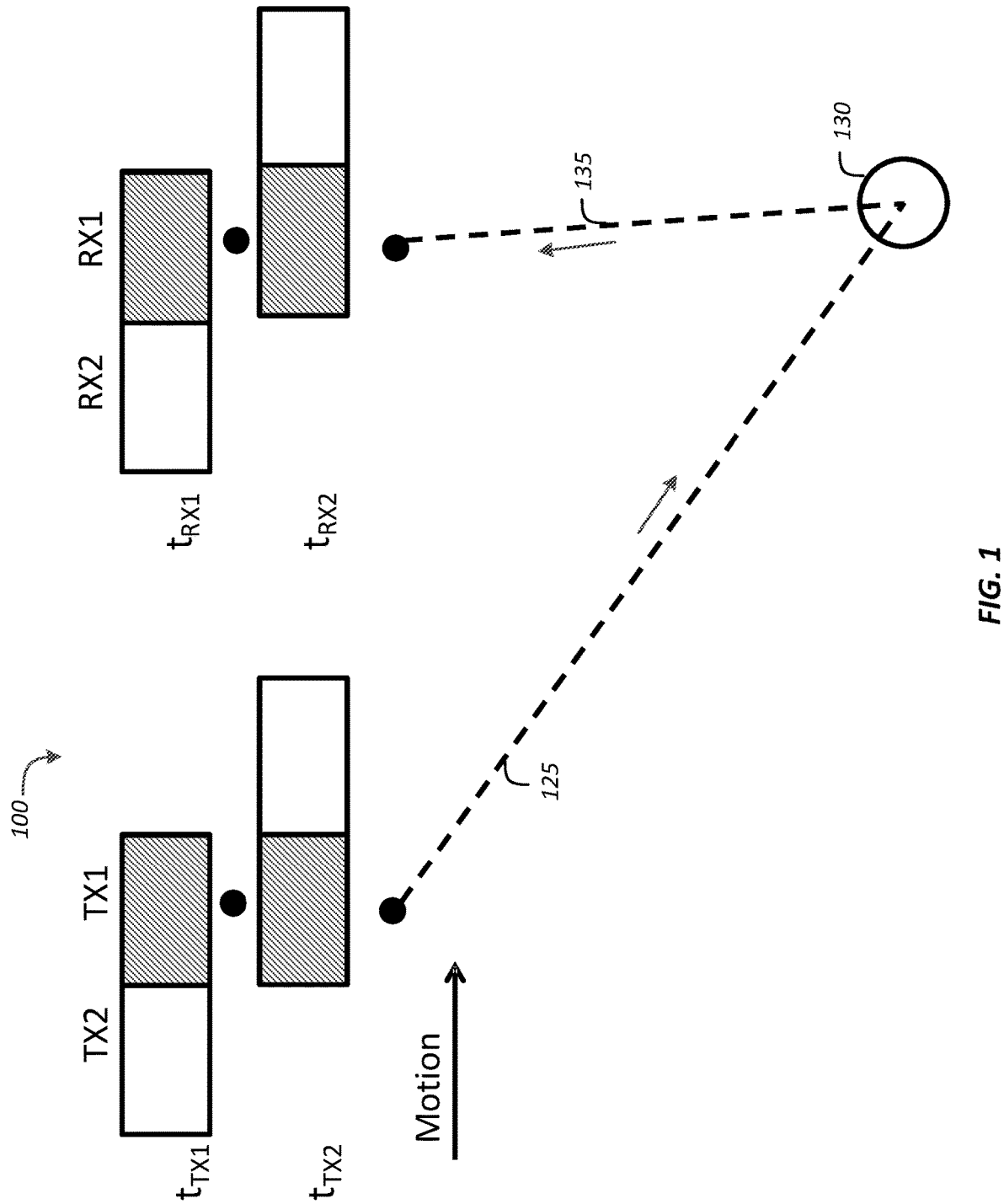
FIG. 1 is a schematic diagram illustrating the first step in a three-step introduction to the theory of operation of the disclosed technology.

Acoustic velocity measurement instruments used in underwater vehicles, among other applications, can be configured with small aperture acoustic velocity sensor (SAAVS) transducer arrays having a number of phased array sub-arrays. Each transducer generates a beam of acoustic energy. Measurement of the three velocity components using acoustic phase differences in both time and space allows unusually good performance even when the aperture is small. This makes the acoustic beams relatively wide compared to existing high-performance Doppler velocity logs of the same frequency. It also has advantages for high-speed applications.

Embodiments of the disclosed technology overcome certain disadvantages of correlation velocity logs. The SAAVS avoids specular return near nadir by using spatial modulation to create multiple slanted acoustic beams. It also avoids having to model the bottom backscatter characteristics with multiple parameters by using somewhat narrower and more slanted acoustic beams. It also avoids the low signal to noise ratio (SNR) and high flow noise of cross-correlations of individual array elements typically used in CVLs by forming a weighted average of spatially-demodulated sub-array returns over nearly the entire available aperture before the non-linear cross-correlation step. It also can improve the SNR by using the entire available aperture for projection. Furthermore, it can overcome the discrete nature of the cross-correlation domain by using spatial and/or temporal interpolation before the cross-correlation step to make accurate estimates of the phase and amplitude at or near the point of peak cross-correlation magnitude in time and space.

The disclosed technology includes a number of innovative features. It can use weighted interpolation of sub-array measurements to spatially shift the array centroid for projection and/or hydrophone receipt of echoes and cross-correlation of successive pulses to improve correlation and reduce bias. The disclosed technology uses spatial modulation for a projected signal. The disclosed technology measures spatial phase slope across the set of sub-arrays allowing correction of both long- and short-term errors. The disclosed technology can use both spatial and temporal interpolation. The disclosed technology makes efficient use of the available aperture. The disclosed technology can use phase measurements to measure two or three velocity components and to calculate the spatial lags necessary to optimize performance.

One way of describing how the disclosed technology works is to consider the pattern in a horizontal plane of an acoustic bottom echo from a horizontally-moving continuous narrowband source. Due to incoherent backscatter from a random collection of scatterers on a bottom that is rough compared to the acoustic wavelength, there is a random echo pattern that will tend to move in the opposite direction from the source motion with equal speed before eventually changing to a different pattern. A cross-correlation of acoustic signal measurements that tracks this pattern motion in time and space is a sensitive measure of movement because the variability in the pattern itself (known as "phase noise" when not tracked) is not included in the measurement. The same principle applies to broadband signals that repeat at or near the time lag of the cross-correlation measurement. The description above describes the principle that allows all correlation velocity logs to work. The SAAVS applies the same principle to a Doppler velocity log having multiple slanted acoustic beams.

FIG. 1 is a schematic diagram illustrating the first step in a three-step introduction to the theory of operation of the disclosed technology. Projectors TX1 and TX2, and hydrophones (receivers) RX1 and RX2 are spaced along the direction of travel. Forward projector TX1 and aft projector TX2 each project a short acoustic signal in the same direction at times $t_{TX1}$ and $t_{TX2}$, respectively. Each signal follows a path 125 towards a scattering object 130, and echoes off of scattering object 130 along path 135 to be received by hydrophones RX1 and RX2 at times $t_{RX1}$ and $t_{RX2}$, respectively. The time lag ($t_{TX2}-t_{TX1}$) is set equal to the ratio of vehicle speed to projector spacing such that the two projectors are aligned in identical locations relative to the bottom when projecting the same part of the signal.

Hydrophones RX1 and RX2 have the same spacing as projectors TX1 and TX2, and receive the respective echoes off of a representative scattering object 130 along path 135 at identical locations and with the same time lag ($t_{RX2}-t_{RX1}=t_{RX2}-t_{TX1}$) as there was between the projected signals. When shifted by the time lag ($t_{TX2}-t_{TX1}$), the signals will match no matter which direction the acoustic beam points because the sound takes identical paths. In general, the speed will not exactly match the ratio of transducer spacing to the time lag between the projected signals, and the velocity vector will not be exactly aligned with the vector of spatial displacement between transducers. The phase of the demodulated correlation function is a sensitive measure of the velocity component in the direction of the acoustic beam just like an ordinary Doppler velocity log, but now with a velocity offset making the phase zero at the nominal velocity that makes both pulses follow identical paths.

Figure 2:
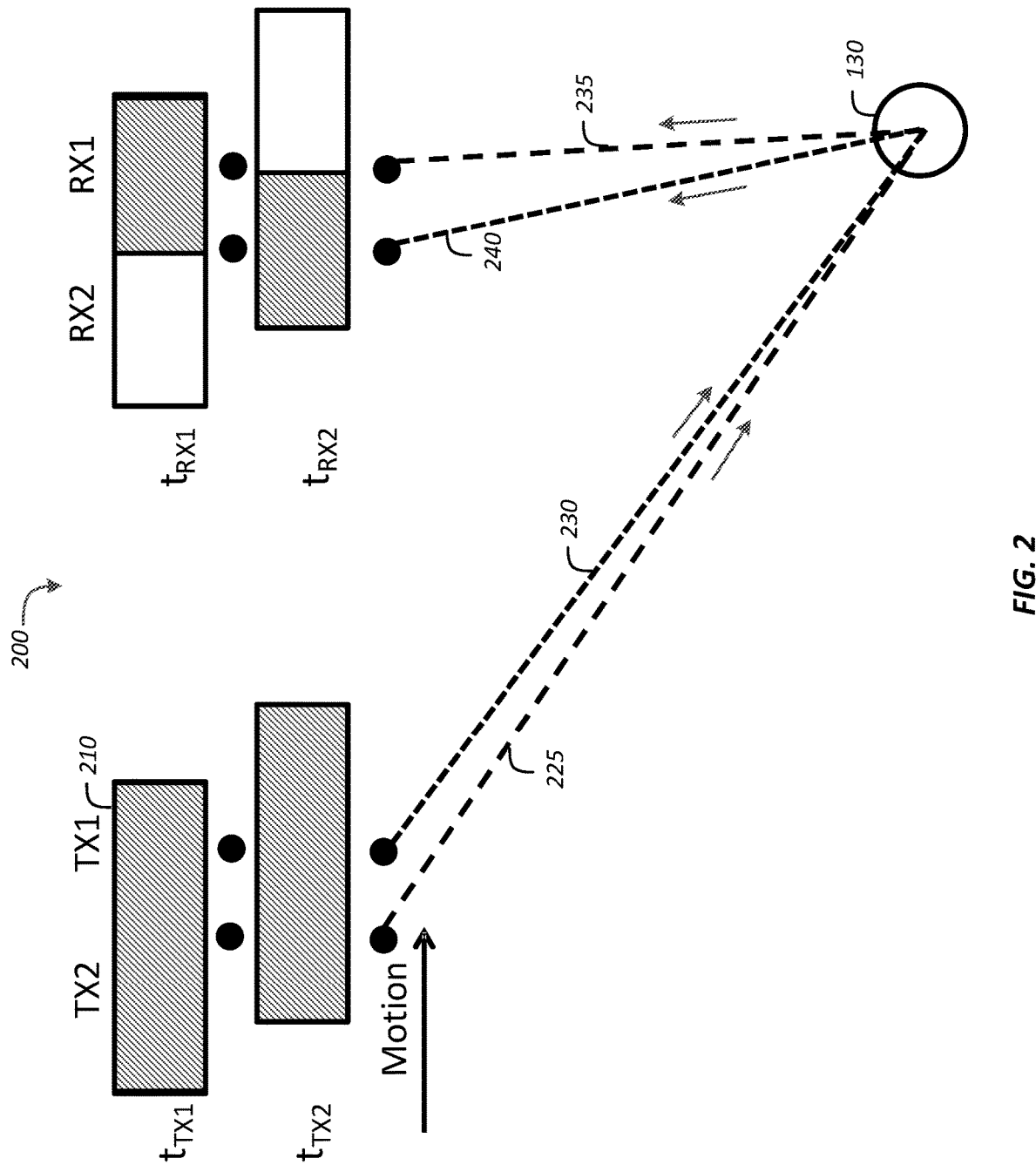
FIG. 2 is a schematic diagram illustrating the second step in the three-step introduction to the theory of operation of the disclosed technology.

FIG. 2 is a schematic diagram illustrating the second step in the three-step introduction to the theory of operation of the disclosed technology. For the second step, we relax the condition that the projector and hydrophone pairs TX1/TX2 and RX1/RX2, respectively, must have identical spatial separations, replacing it with the more general condition that the sum of the projector and hydrophone separations on the moving vehicle matches twice the product of the speed and the lag time between projected pulses at the nominal offset velocity. For example, a single projector 210 can send two pulses at each of times $t_{TX1}$ and $t_{TX2}$ along paths 225 and 230 towards scattering object 130 (and even more than two successive pulses at the same time lag) if the spacing of the hydrophone pair is doubled or the time lag is halved relative to those of the first step. These two pairs of pulses are reflected (echoed) off of scattering object 130 towards hydrophones RX1 and RX2 along paths 235 and 240, where they are received at times $t_{RX1}$ and $t_{RX2}$, respectively.

The reason this still works is the bistatic invariance principle, described below with respect to FIG. 4, which stems from the fact that the relative phases among a group of scatterers will be the same for any two pairs of down-going ray paths 225 and 230, and up-going ray paths 235 and 240 that share the same angle bisector even though the scattering angles differ. In the single-projector example, illustrated schematically in FIG. 2, the location of the second hydrophone RX2 relative to the bottom is behind the location of the first hydrophone RX1 one lag time earlier by the same distance that the projector has moved forward relative to the bottom in the lag time, keeping the angle bisectors the same for the ray paths of the two pulses. Benefits could arise from stopping at this second step.

Figure 3:
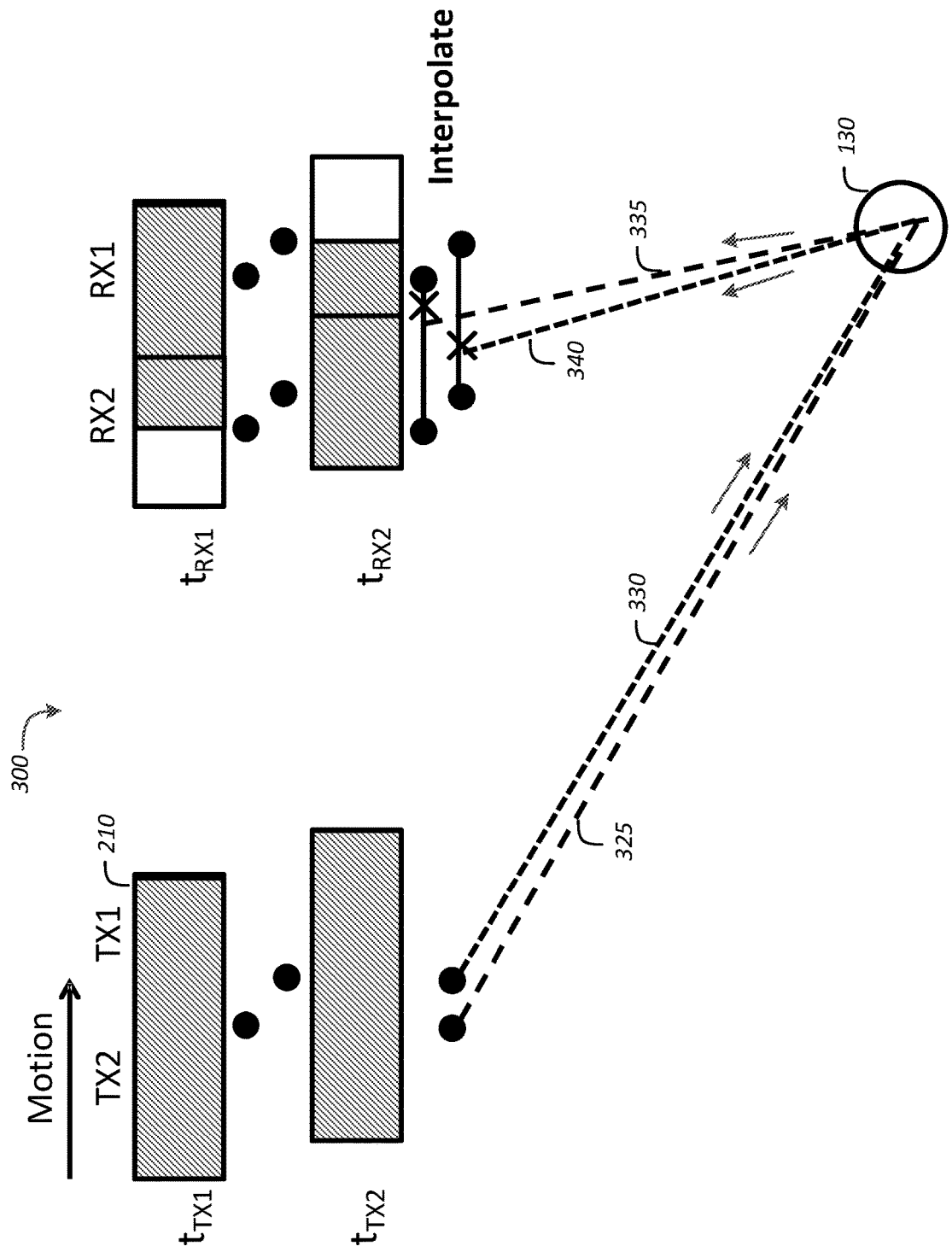
FIG. 3 is a schematic diagram illustrating the third step in the three-step introduction to the theory of operation of the disclosed technology.

FIG. 3 is a schematic diagram illustrating the third step in the three-step introduction to the theory of operation of the disclosed technology. A single projector 210 a can send two pulses at each of times $t_{TX1}$ and $t_{TX2}$ along paths 325 and 330 towards scattering object 130 if the time lag ($t_{TX2}-t_{TX1}$) between them is the same or shorter than that of the previous step. These two pulses are reflected (echoed) off of scattering object 130 towards hydrophones RX1 and RX2 along paths 335 and 340, where they are received at times $t_{RX1}$ and $t_{RX2}$, respectively. For the third step, the practical difficulty of creating overlapping sub-arrays having a particular spatial displacement is overcome by interpolating measurements between non-overlapping phased array segments using a weighted average with different weights at each receive time. In an embodiment, the non-overlapping phased array segments ("sub-arrays") are abutting or nearly so. Using interpolation to create this centroid shift allows continuous adjustment of spatial lag with only a small cost in reduced correlation magnitude.

Figure 4:
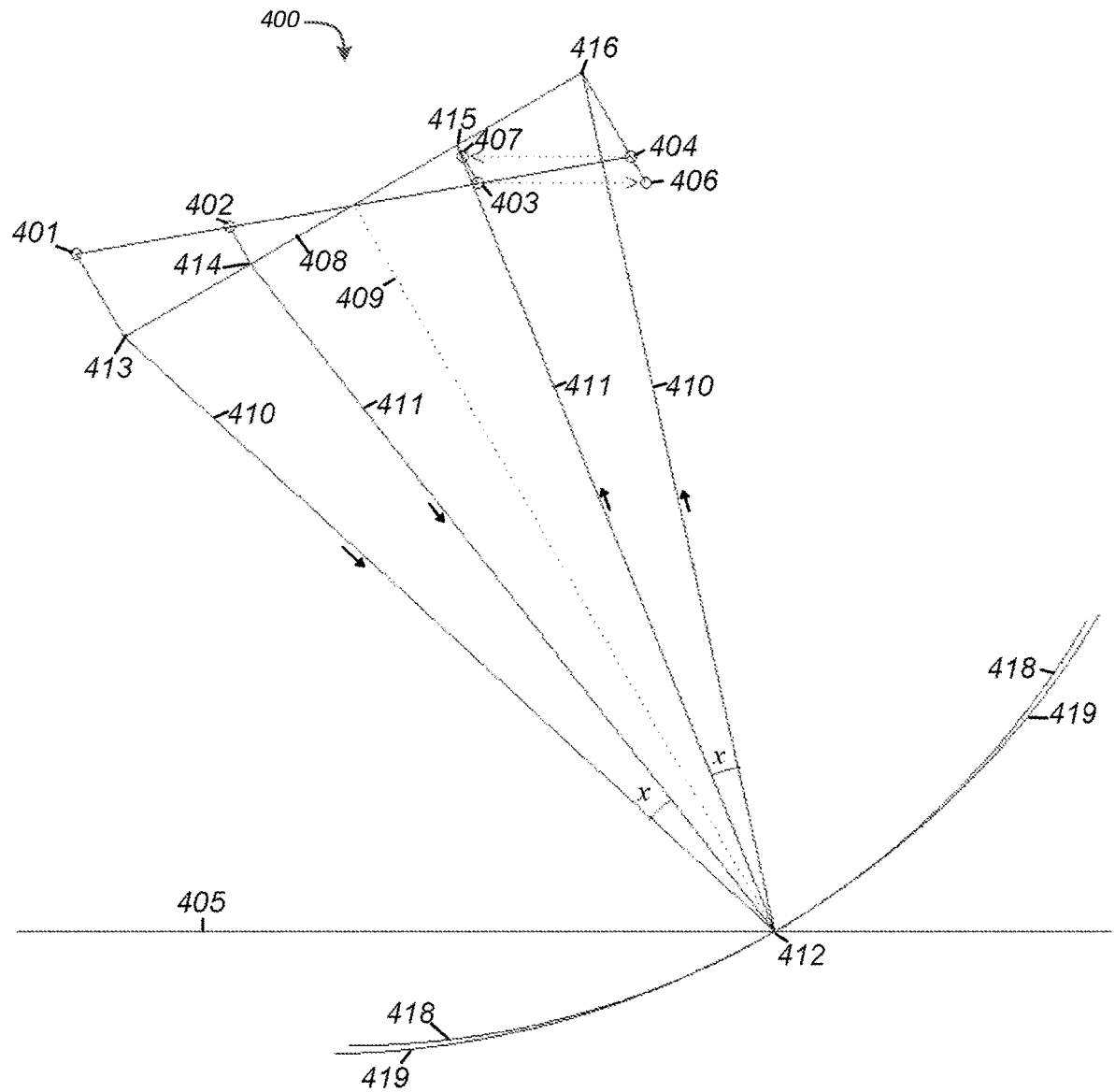
FIG. 4 is a diagram illustrating the projection of the velocity vector and hydrophone displacement onto the plane perpendicular to the axis of an acoustic beam, as well as illustrating the bistatic invariance principle.

The bistatic invariance principle is illustrated in FIG. 4. Suppose that the array is level and the vehicle is moving to the right with a small upward component to the velocity. The four circles 401-404 along the line sloping gently upward at 10° represent from left to right the successive positions, relative to the bottom 405, occupied by the physical center of the array (which functions as both projector array and hydrophone array), 401 and 402 at the times of projection of two separate pings and 403 and 404 upon receipt of the two echoes separated by approximately the same projection time lag Ti. Using interpolation by weighted averaging of sub-arrays as illustrated in FIG. 3, the effective centroid of the hydrophone array can be shifted horizontally from the physical center as indicated by the dotted arrows (403→406 and 404→407), effectively swapping the positions of the hydrophone array centroid at the two receive times and then shifting them a bit farther apart to allow for the vertical component of velocity.

For convenience, with only a slight approximation we can simplify the picture by projecting the velocity and hydrophone displacements onto the plane indicated by the line 408 that is perpendicular to the acoustic beam axis 409. The sound ray paths 410 and 411 to a scatterer on the bottom at the acoustic beam pattern centroid 412 and back form two isosceles triangles, the angle bisectors of both the outer paths of the first pulse and the inner paths of the second pulse matching the acoustic beam axis 409. When this bistatic invariance geometry occurs, the angle $\chi$ between the downgoing paths will match the similar angle between the upgoing paths. This will be ensured if the spacing of the projected projector locations matches the spacing of the projected displaced hydrophone centroids.

Bistatic invariance geometry is sometimes referred to as phase center coincidence, the term "phase center" meaning for each pulse the midpoint between the projected positions of the effective centroids of the projector and hydrophone relative to the bottom. In FIG. 4, the phase centers coincide at the intersection of the acoustic beam axis 409 and its perpendicular 408. The outer (413 and 416) and inner (414 and 415) projected projector-hydrophone centroid pairs act as the foci of two ellipsoidal surfaces of constant travel time, represented by the two elliptical arcs 418 and 419 drawn through the bottom scatterer on the acoustic beam axis 412, where they are tangent to each other. Because the ellipsoids are tangent, the difference in travel time is nearly constant for all scatterers in the neighborhood of the point of tangency, which should include most of the acoustic beam. Although the phase of each of these scatterers is random, their differences in phase from one pulse to the next will be nearly the same for all, resulting in a high correlation coefficient at the lag between pulse echo arrivals. When the bistatic invariance condition is not met, the ellipsoids intersect, making the phase difference vary across the acoustic beam and reducing the correlation of the measurements.

Note that for clarity FIG. 4 is not drawn to scale. The mean eccentricity of the ellipsoids is actually on the order of the Mach number and the angles $\chi$ between paths (in radians) are on the order of the product of the Mach number and the ratio of inter-pulse interval $T_L$ to travel time. Although FIG. 4 illustrates the bistatic invariance principle in the context of bottom scattering, the principle also applies analogously to a time-gated scattering volume that is part of a measured velocity profile or that is being used in a DVL to measure vehicle velocity when the bottom is not within range or to measure current in anticipation of bottom track being lost in the future.

Now a quantitative theory of operation will be disclosed for the SAAVS technology. For simplicity, an embodiment is described having four acoustic beams numbered 1 to 4, all nominally at Janus angle $J_0$=30 to the vertical, and having azimuth directions 90° apart aligned with the interpolation axes. For this particular embodiment, the x axis is aligned laterally across the vehicle, positive to starboard, with acoustic beam 1 pointed to port and acoustic beam 2 to starboard. The y axis is aligned longitudinally, positive forward, with acoustic beam 3 pointed forward and acoustic beam 4 pointed aft. The z axis is nominally upward when the vehicle is level. For this embodiment, the phased array stave spacing is ½ wavelength at the center frequency of the projected signal and the phase change per stave is 90° for signals arriving at the nominal Janus angle. Those skilled in the art will understand that this theory can easily be extended to other geometries, including other interpolation geometries, other array spacings, other array phasings, fewer acoustic beams or velocity components, or to an array configuration that uses switching, multiplexing, or a large number of simultaneous channels instead of or in addition to interpolation to shift the array centroid as needed to satisfy the bistatic invariance condition, at least approximately.

The theory presented here is only a first-order approximation; various small potential bias terms have been omitted for simplicity. Those skilled in the art will also understand that it can be desirable to include various undisclosed bias and other error corrections and that a variety of approaches to error correction are available, including asymptotic expansion and empirical or semi-empirical calibration and that algorithmic iteration can be required in some approaches. Those skilled in the art will also understand that the theory can be extended to include the effects of pitch, roll, yaw, and their rates, as well as linear acceleration, all of which have been neglected in this disclosure for simplicity.

Consider position displacements in the bottom frame of reference due to level constant-velocity motion over the short lag interval $T_L$ and horizontal hydrophone array displacement d in the vehicle frame, as illustrated in FIGS. 3 and 4. Demodulated sample pairs are correlated at a time interval nominally equal to an integer multiple of the pulse repetition interval $T_L$. Besides being displaced in time, the samples of each pair also can be spatially displaced in the nominally-horizontal plane of the array to increase the correlation by satisfying the bistatic invariance condition, at least partially. We assume here that the displacement of the array centroid is being accomplished by interpolation among sub-arrays, although other means could be used instead. The motions of both the vehicle relative to the bottom and the hydrophone array relative to the vehicle are detected by projecting them onto the four acoustic beams.

The phase (in radians) measured in the four acoustic beams should theoretically obey the following equations:

$$\phi_1 = \frac{\pi}{U_a}(-u \sin J_1 - w\cos J_1) - \frac{\pi}{2U_a T_L} d_{x1} \sin J_1 \quad (1)$$

-continued $$\phi_2 = \frac{\pi}{U_a}(u \sin J_2 - w\cos J_2) + \frac{\pi}{2U_aT_L}d_{x2} \sin J_2 \quad (2)$$

$$\phi_3 = \frac{\pi}{U_a}(v \sin J_3 - w\cos J_3) + \frac{\pi}{2U_aT_L}d_{y3} \sin J_3 \quad (3)$$

$$\phi_4 = \frac{\pi}{U_a}(-v \sin J_4 - w\cos J_4) - \frac{\pi}{2U_aT_L}d_{y4} \sin J_4 \quad (4)$$

The velocity components u, v, and w are those of the vehicle relative to the bottom and $U_a$ is the $\pi$-phase ambiguity velocity, making $U_aT_L=\frac{1}{2}\lambda$, where $\lambda$ is the acoustic wavelength. In general, the hydrophone displacement can be different for each acoustic beam, so we have distinguished the displacements by using the symbol $d_{an}$ to represent the hydrophone array displacement in the direction of axis a for acoustic beam n.

Eqns. 1-4 show that the phase of each acoustic beam measures the velocity and displacement projected onto the acoustic beam axis. In contrast, the bistatic invariance condition relates to the velocity and displacement projected onto the plane perpendicular to the acoustic beam axis, at least to the order of approximation being considered here. Motion can be detected in this perpendicular plane by locating the correlation peak with variation in the hydrophone displacement by varying the interpolation parameters to maximize the correlation magnitude. This CVL method has more short-term and long-term error than the acoustic beam-axis Doppler phase measurement, but lacking the phase ambiguity of the latter method, it can be useful for ambiguity resolution. Even if the correlation peak is not searched for, operating at or near the peak minimizes the standard deviation of the Doppler phase measurement. Neglecting higher-order bias terms, bistatic invariance imposes the following constraints, two for each acoustic beam:

$$2T_L(u \cos J_1 - w \sin J_1) + d_{x1} \cos J_1 = 0 \quad (5)$$

$$2T_Lv + d_{y1} = 0 \quad (6)$$

$$2T_L(u \cos J_2 + w \sin J_2) + d_{x2} \cos J_2 = 0 \quad (7)$$

$$2T_Lv + d_{y2} = 0 \quad (8)$$

$$2T_Lu + d_{x3} = 0 \quad (9)$$

$$2T_L(v \cos J_3 + w \sin J_3) + d_{y3} \cos J_3 = 0 \quad (10)$$

$$2T_Lu + d_{x4} = 0 \quad (11)$$

$$2T_L(v \cos J_4 - w \sin J_4) + d_{y4} \cos J_4 = 0 \quad (12)$$

It is convenient to define mean Janus angles $J_x=\frac{1}{2}(J_1+J_2)$ and $J_y=\frac{1}{2}(J_3+J_4)$ and angle differences $\Delta J_x=J_1-J_2$ and $\Delta J_y=J_3-J_4$ for the acoustic beam pairs. Typically, the Janus angle differences are small unknown noises that average to zero. It is also convenient to similarly define mean acoustic beam pair phases $\phi_x=\frac{1}{2}(\phi_1+\phi_2)$ and $\phi_y=\frac{1}{2}(\phi_3+\phi_4)$ and pair phase differences $\Delta\phi_x=\phi_1-\phi_2$ and $\Delta\phi_y=\phi_3-\phi_4$, along with mean pair hydrophone displacement components $d_{x12}=\frac{1}{2}(d_{x1}+d_{x2})$, $d_{y12}=\frac{1}{2}(d_{y1}+d_{y2})$, $d_{x34}=\frac{1}{2}(d_{x3}+d_{x4})$ and $d_{y34}=\frac{1}{2}(d_{y3}+d_{y4})$ and pair displacement difference components $\Delta d_{x12}=d_{x1}-d_{x2}$, $\alpha d_{y12}=d_{y1}-d_{y2}$, $\Delta d_{x34}=d_{x3}-d_{x4}$ and $\Delta d_{y34}=d_{y3}-d_{y4}$.

With these substitutions, phase equations Eqns. 1-4 become:

$$\Delta\phi_x = -\frac{2\pi}{U_a}\left(\left(u + \frac{d_{s12}}{2T_L}\right)\sin J_x \cos\left(\frac{1}{2}\Delta J_x\right) + \left(-w\tan J_x + \frac{\Delta d_{x12}}{4T_L}\right)\cos J_x \sin\left(\frac{1}{2}\Delta J_s\right)\right) \quad (13)$$

$$\Delta\phi_y = \frac{2\pi}{U_a}\left(\left(v + \frac{d_{y34}}{2T_L}\right)\sin J_y \cos\left(\frac{1}{2}\Delta J_y\right) + \left(w\tan J_y + \frac{\Delta d_{y34}}{4T_L}\right)\cos J_y \sin\left(\frac{1}{2}\Delta J_y\right)\right) \quad (14)$$

$$\phi_x = -\frac{\pi}{U_a}\left(\left(u + \frac{d_{r12}}{2T_L}\right)\cos J_x \sin\left(\frac{1}{2}\Delta J_x\right) + \left(w\cot J_x + \frac{\Delta d_{x12}}{4T_L}\right)\sin J_x \cos\left(\frac{1}{2}\Delta J_x\right)\right) \quad (15)$$

$$\phi_y = \frac{\pi}{U_a}\left(\left(v + \frac{d_{y34}}{2T_L}\right)\cos J_y \sin\left(\frac{1}{2}\Delta J_y\right) + \left(-w\cot J_y + \frac{\Delta d_{y34}}{4T_L}\right)\sin J_y \cos\left(\frac{1}{2}\Delta J_y\right)\right) \quad (16)$$

The bistatic invariance conditions Eqns. 5-12 become:

$$d_{x12}+2T_Lu-\frac{1}{2}(\Delta d_{x12}+4T_Lw \cot J_x)\tan J_x \tan(\frac{1}{2}\Delta J_x)=0 \quad (17)$$

$$d_{y12}+2T_Lv=0 \quad (18)$$

$$d_{x34}+2T_Lu=0 \quad (19)$$

$$d_{y34}+2T_Lv-\frac{1}{2}(\Delta d_{y34}-4T_Lw \cot J_y)\tan J_y \tan(\frac{1}{2}\Delta J_y)=0 \quad (20)$$

$$\Delta d_{x12}-4T_Lw \tan J_x-2(d_{x12}+2T_Lu)\tan J_x \tan(\frac{1}{2}\Delta J_x)=0 \quad (21)$$

$$\Delta d_{y12}=0 \quad (22)$$

$$\Delta d_{x34}=0 \quad (23)$$

$$\Delta d_{y34}+4T_Lw \tan J_y-2(d_{y34}+2T_Lv)\tan J_y \tan(\frac{1}{2}\Delta J_y)=0 \quad (24)$$

Suppose that the embodiment allows displacement in both horizontal dimensions, and that we choose the following hydrophone displacement values, which are approximate in the sense that they satisfy Eqns. 17, 20, 21, and 24 only when the acoustic beam Janus angles match within each pair (i.e. $\Delta J_x=\Delta J_y=0$):

$$d_{x12}=d_{x34}=-2T_Lu \quad (25)$$

$$d_{y12}=d_{y34}=-2T_Lv \quad (26)$$

$$\Delta d_{x12}=4T_Lw \tan J_x \quad (27)$$

$$\Delta d_{y34}=-4T_Lw \tan J_y \quad (28)$$

$$\Delta d_{y12}=\Delta d_{x34}=0 \quad (29)$$

Then with these hydrophone displacement values, Eqns. 13-16 become:

$$\Delta\phi_x = \Delta\phi_y = 0 \quad (30)$$

$$\phi_x = -\frac{\pi}{U_a}w\frac{\cos\left(\frac{1}{2}\Delta J_y\right)}{\cos J_x} \cong -\frac{\pi}{U_a}w\sec J_x \quad (31)$$

$$\phi_y = -\frac{\pi}{U_a}w\frac{\cos\left(\frac{1}{2}\Delta J_y\right)}{\cos J_y} \cong -\frac{\pi}{U_a}w\sec J_y \quad (32)$$

Interestingly, Eqns. 25-28 null the phase differences (Eqns. 13 and 14) even when the acoustic beams have different Janus angles, no matter what those angles are.

Furthermore, when the Janus angles do match in each acoustic beam pair, the horizontal velocity components decouple from the vertical velocity and can therefore be detected without bias from uncertainty in either Janus angle or sound speed by varying $d_{x12}$ and $d_{y34}$ until the phase nulls are found, so long as the gain factors $\sin J_x$ and $\sin J_y$ are non-zero. In contrast, the vertical component can be measured through the mean phases $\phi_x$ and $\phi_y$, but these can be biased by errors in Janus angle or sound speed.

In general, the maximum possible correlation may be reached for any particular acoustic beam at a displacement point other than that given by Eqns. 25-29, for a number of reasons including Janus angle differences within acoustic beam pairs. Some embodiments can seek to increase the correlation by using different displacements than these, in which case Eqns. 13-16 can be inverted to solve for the velocity components. The Janus angle of an acoustic beam can be estimated in a number of ways, including using the slope of the acoustic beam phase with respect to changes in the interpolation parameter.

Figure 6:
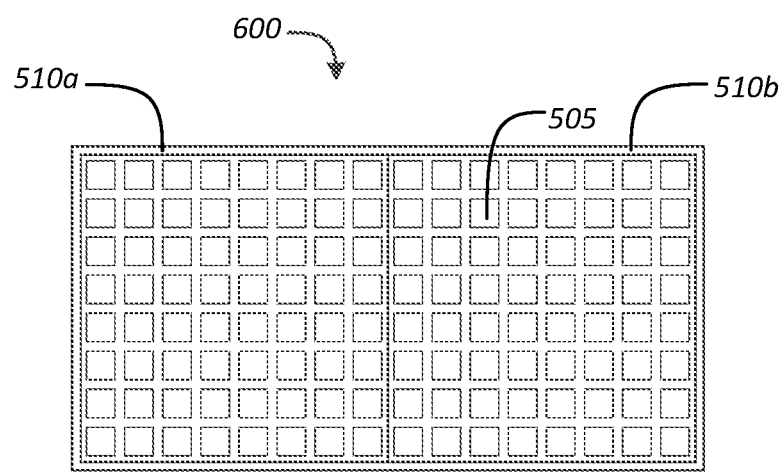
FIG. 6 is a diagram of a grid of two rectangular receive sub-arrays that cover the full aperture of the transmit array of a small aperture acoustic velocity sensor according to an embodiment of the disclosed technology.

For an embodiment having only one horizontal interpolation axis, say the y axis aligned with acoustic beams 3 and 4, and three measured velocity components, perhaps using an array similar to that shown in FIG. 6, it is not possible to select non-zero values for $d_{x12}$, $d_{x34}$, and $\Delta d_{x34}$. In that case, Eqns. 25 and 27 would not apply. Instead of Eqns. 30-32, we would have:

$$\Delta\phi_x = \frac{2\pi}{U_a}\left(-u\cos\left(\frac{1}{2}\Delta J_x\right) + w\sin\left(\frac{1}{2}\Delta J_x\right)\right)\sin J_x \cong -\frac{\pi}{U_a} u \sin J_x \quad (33)$$

$$\Delta\phi_y = 0 \quad (34)$$

$$\Delta\phi_x = -\frac{\pi}{U_a}\left(u\sin\left(\frac{1}{2}\Delta J_x\right) + w\cos\left(\frac{1}{2}\Delta J_x\right)\right)\cos J_x \cong -\frac{\pi}{U_a} w \cos J_x \quad (35)$$

$$\phi_y = -\frac{\pi}{U_a} w \frac{\cos\left(\frac{1}{2}\Delta J_y\right)}{\cos J_y} \cong -\frac{\pi}{U_a} w \sec J_y \quad (36)$$

Acoustic beams 1 and 2 would behave like those of an ordinary Doppler DVL, except that the correlation would be improved by the array displacement along the y axis. Acoustic beams 3 and 4 would behave like those of the two-interpolation-axes SAAVS embodiment described above, except that the correlation can be somewhat lower due to the lack of array displacement along the x axis. When the lateral velocity component v is significant compared to u, there would be decorrelation in all acoustic beams and consequent increased standard deviation in all velocity components compared to an embodiment having two interpolation axes.

Because each sub-array of the phased array already performs spatial demodulation in determining the phase of the arriving signal relative to a particular point on the array, it is convenient and natural to use a weighted combination of these phases when interpolating. Suppose we use the centroid of each sub-array as its phase reference point. If the sub-array centroids are separated by an integer multiple of two wavelengths (four staves for this embodiment), then for a signal arriving from a single source at the nominal acoustic beam angle there will be no apparent phase difference between the sub-arrays, even though the phase difference is theoretically an integer multiple of $2\pi$. When applied to the phase change resulting from a particular hydrophone displacement that has been created by shifting the centroid of a weighted-average array synthesized with real weights, the effect of spatial demodulation is to shift the phase in acoustic beam 3, say, by $$\frac{\pi}{2U_a T_L} d_3 (\sin J_3 - \sin J_0)$$

instead of $$\frac{\pi}{2U_a T_L} d_3 \sin J_3.$$

The receive acoustic beam direction can be shifted slightly by introducing a complex "twiddle factor" to the weights that combine the sub-arrays. In that case, $J_0$ in the expression means the adjusted direction rather than 30°. We can modify Eqns. 1-4 to recognize the spatial demodulation effect on phase. Eqns. 13-16 respectively become:

$$\Delta\phi_x = -\frac{2\pi}{U_a}\left(\left(u + \frac{d_{x12}}{2T_L}\right)\sin J_x \cos\left(\frac{1}{2}\Delta J_x\right) + \right. \quad (37)$$
$$\left. \left(-w\tan J_x + \frac{\Delta d_{x12}}{4T_L}\right)\cos J_x \sin\left(\frac{1}{2}\Delta J_x\right) - \frac{d_{x12}}{2T_L}\sin J_0\right)$$

$$\Delta\phi_y = \frac{2\pi}{U_a}\left(\left(v + \frac{d_{y34}}{2T_L}\right)\sin J_y \cos\left(\frac{1}{2}\Delta J_y\right) + \right. \quad (38)$$
$$\left. \left(w\tan J_y + \frac{\Delta d_{y34}}{4T_L}\right)\cos J_y \sin\left(\frac{1}{2}\Delta J_y\right) - \frac{d_{y34}}{2T_L}\sin J_0\right)$$

$$\phi_x = -\frac{\pi}{U_a}\left(\left(u + \frac{d_{x12}}{2T_L}\right)\cos J_x \sin\left(\frac{1}{2}\Delta J_x\right) + \right. \quad (39)$$
$$\left. \left(w\cot J_x + \frac{\Delta d_{x12}}{4T_L}\right)\sin J_x \cos\left(\frac{1}{2}\Delta J_x\right) - \frac{\Delta d_{x12}}{4T_L}\sin J_0\right)$$

$$\phi_y = \frac{\pi}{U_a}\left(\left(v + \frac{d_{y34}}{2T_L}\right)\cos J_y \sin\left(\frac{1}{2}\Delta J_y\right) + \right. \quad (40)$$
$$\left. \left(-w\cot J_y + \frac{\Delta d_{y34}}{4T_L}\right)\sin J_y \cos\left(\frac{1}{2}\Delta J_y\right) - \frac{\Delta d_{y34}}{4T_L}\sin J_0\right)$$

Using the hydrophone displacements from Eqns. 25-29 exactly as before, Eqns. 30-32 become:

$$\Delta\phi_x = -\frac{2\pi}{U_a} u \sin J_0 \quad (41)$$

$$\Delta\phi_y = \frac{2\pi}{U_a} v \sin J_0 \quad (42)$$

$$\phi_x = \quad (43)$$
$$-\frac{\pi}{U_a} w \frac{\cos\left(\frac{1}{2}\Delta J_x\right) - \sin J_x \sin J_0}{\cos J_x} \cong -\frac{\pi}{U_a} w (\sec J_x - \tan J_x \sin J_0)$$

$$\phi_y = -\frac{\pi}{U_a} w \frac{\cos\left(\frac{1}{2}\Delta J_y\right) - \sin J_y \sin J_0}{\cos J_y} \cong \quad (44)$$
$$-\frac{\pi}{U_a} w (\sec J_y - \tan J_y \sin J_0)$$

Eqns. 41 and 42 show that the effect of spatial demodulation on the horizontal velocity component is to make the SAAVS act like an ideal Doppler DVL with the nominal Janus angle, corrected for both terrain/absorption bias and stochastic deviations of the arrival angle. When $\Delta J_x = \Delta J_y = 0$ and $J_x = J_y = J_0$, the trigonometric factor in the final expression of Eqns. 43 and 44 becomes $\cos J_0$, as one would expect from an ideal Doppler DVL.

For the embodiment having only one interpolation axis, with spatial demodulation Eqns. 33-36 become:

$$\Delta\phi_x = \frac{2\pi}{U_a}\left(-u\cos\left(\frac{1}{2}\Delta J_x\right) + w\sin\left(\frac{1}{2}\Delta J_x\right)\right)\sin J_x \cong -\frac{\pi}{U_a}i\sin J_x \quad (45)$$

$$\Delta\phi_y = \frac{2\pi}{U_a}v\sin J_0 \quad (46)$$

$$\phi_x = -\frac{\pi}{U_a}\left(u\sin\left(\frac{1}{2}\Delta J_x\right) + w\cos\left(\frac{1}{2}\Delta J_x\right)\right)\cos J_x \cong -\frac{\pi}{U_a}w\cos J_x \quad (47)$$

$$\phi_y = -\frac{\pi}{U_a}w\frac{\cos\left(\frac{1}{2}\Delta J_y\right) - \sin J_y \sin J_0}{\cos J_y} \cong \quad (48)$$

$$-\frac{\pi}{U_a}w(\sec J_y - \tan J_y \sin J_0)$$

In this case, only the measurement of forward velocity v is unbiased (Eqn. 46). However, if terrain and absorption bias can be assumed to be independent of acoustic beam azimuth, then the measured value of $J_y$, perhaps after low-pass filtering, can be used to estimate $J_x$.

For broad-bandwidth embodiments when there is no nominally-vertical velocity component w (orthogonal to the array face), the side-peaks of the correlation function in time will have local maxima of correlation magnitude at multiples of the pulse repletion interval $T_L$ of the projected signal, independent of horizontal velocity. However, the peak locations can be Doppler-shifted by the w component of velocity, and the phase measurement at time lag $T_L$ or an integer multiple of it can be biased. A time-interpolation method to correct this bias is disclosed in U.S. Pat. No. 7,542,374. Interpolation in time adds another dimension to the spatial interpolation described above.

Phase measurements from phased arrays are subject to bias due to sidelobe coupling between acoustic beams. Phased arrays with wide acoustic beams are particularly vulnerable to this problem because the sidelobes of their acoustic beam patterns tend to be higher than those of narrower acoustic beams. There are a number of ways to mitigate this problem, including using fewer acoustic beams at the same time, selecting acoustic beam patterns having a wide null in the direction of any acoustic beams being used simultaneously, and a method using different codes on different acoustic beams disclosed in U.S. Pat. No. 7,839,720.

Figure 5:
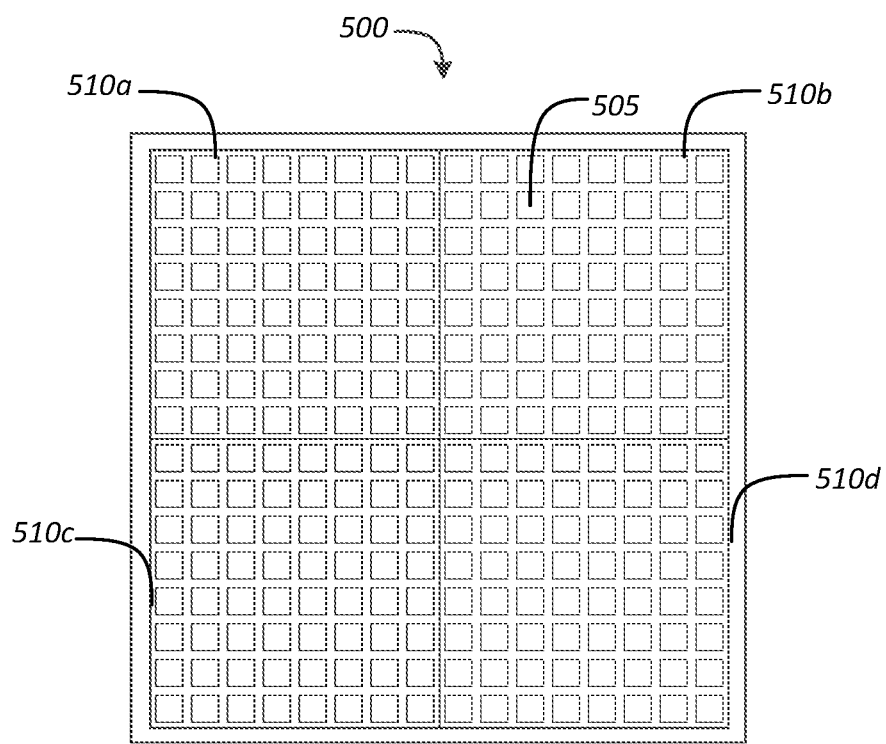
FIG. 5 is a diagram of a grid of four rectangular receive sub-arrays that cover the full aperture of the transmit array of a small aperture acoustic velocity sensor according to an embodiment of the disclosed technology.

FIG. 5 is a diagram of a grid 500 of four rectangular receive sub-arrays 510a. 510b, 510 and 510d that cover the full aperture of the transmit array of a small aperture acoustic velocity sensor according to an embodiment of the disclosed technology. Each subarray includes a plurality of elements 505 arranged in rows and columns. A small aperture acoustic velocity sensor can perform interpolation along one axis, two axes, or a plurality of axes, depending upon the desired application. A particular embodiment of the small aperture acoustic velocity sensor, where interpolation is performed along two axes, is able to utilize the full benefits resulting from interpolation and can estimate three orthogonal velocity components.

FIG. 6 is a diagram of a grid 600 of two receive sub-arrays 510a and 510b that cover the full aperture of the transmit array of a small aperture acoustic velocity sensor according to an embodiment of the disclosed technology. This embodiment of the small aperture acoustic sensor, where interpolation is performed along one axis, is able to utilize the benefits resulting from interpolation and can also estimate three orthogonal velocity components. When there is a lateral drill component to the velocity, the correlation in all acoustic beams will be less than it could be if interpolation were available in the lateral direction, although the correlation of all acoustic beams will be improved compared to having no interpolation at all, reducing the standard deviation of all velocity components. Also, biases attributable to non-ideal arrival angle will not be automatically corrected in the lateral direction, although an appropriate correction factor can be measured in the longitudinal direction and applied explicitly to the lateral velocity measurement. This should be effective so long as the bias is non-directional.

Figure 7:
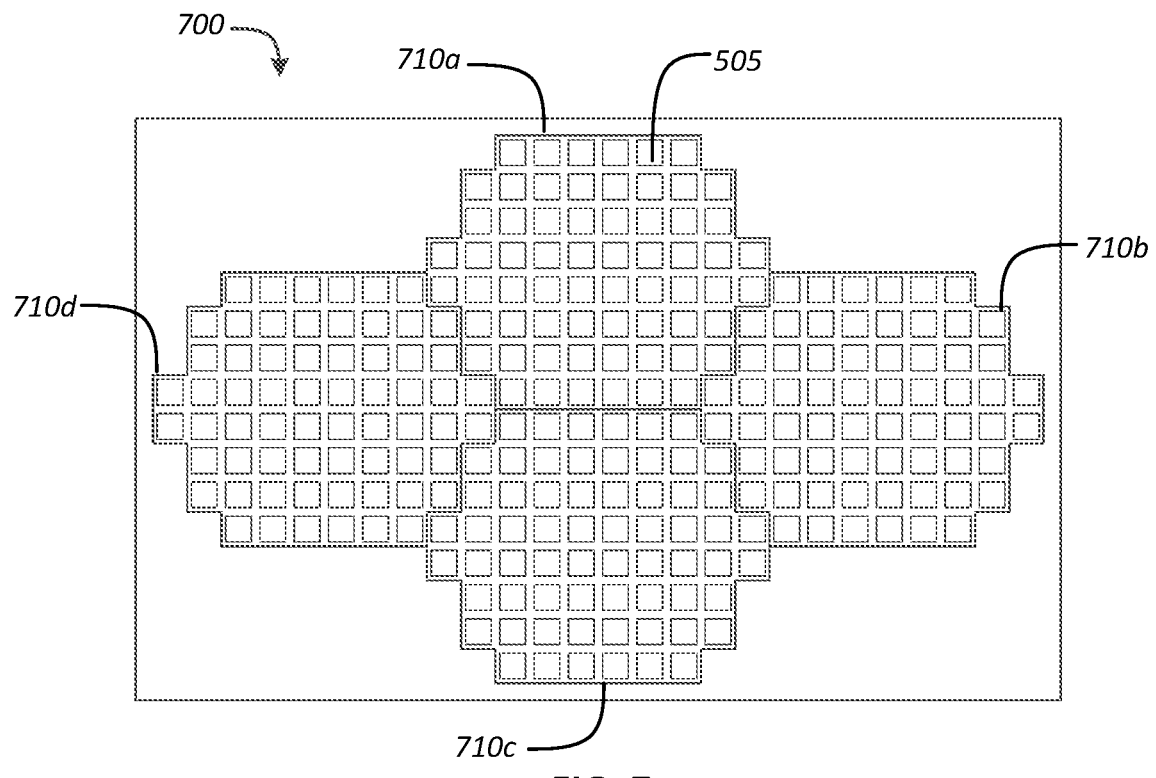
FIG. 7 is a diagram of a grid of four approximately hexagonal receive sub-arrays, aligned with the two center sub-arrays abutting, that cover the full aperture of the transmit array of a small aperture acoustic velocity sensor according to an embodiment of the disclosed technology.

FIG. 7 is a diagram of a grid 700 of four identical hydrophone sub-arrays 710a, 710b, 710c and 710d having approximately hexagonal apertures, aligned with the two center sub-arrays abutting, that cover the full aperture of the transmit array of a small aperture acoustic velocity sensor according to an embodiment of the disclosed technology. The array of FIG. 7 is similar to the array in FIG. 5 and can be used in a small aperture acoustic velocity sensor. A difference between the array of FIG. 7 and FIG. 5 is the shape and layout of the sub-arrays. An approximately hexagonal shaped has a different acoustic beam pattern than a rectangular array and the response attenuation in certain spatial direction can be improved compared to a rectangular array. It is desirable for the acoustic beam pattern of an array to have a spatial response that is as low as possible in undesired directions to be able to separate the angle of arrival of acoustic energy. There are typically tradeoffs between acoustic beam pattern responses in different directions, where one array can have a lower response than another array in a given undesired direction, but a higher response in some other undesired direction. Depending on the application, configuration, layout, and requirements, one particular array shape and the corresponding acoustic beam pattern can be favored over other array shapes.

Figure 8:
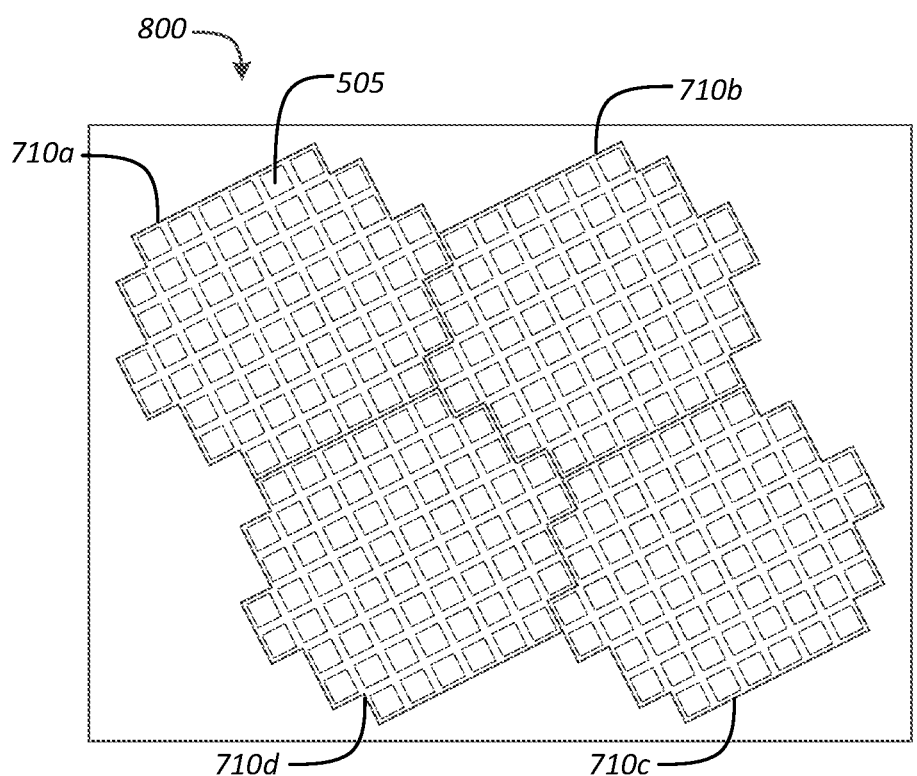
FIG. 8 is a diagram of a grid of four approximately hexagonal receive sub-arrays, rotated by an amount to fit a rectangular surface, that cover the full aperture of the transmit array of a small aperture acoustic velocity sensor according to an embodiment of the disclosed technology.

FIG. 8 is a diagram of a grid 800 of four identical receive sub-arrays 710a, 710b, 710c and 710d having approximately hexagonal apertures, rotated by an amount to fit a rectangular surface, that cover the full aperture of the transmit array of a small aperture acoustic velocity sensor according to an embodiment of the disclosed technology. The array of FIG. 8 is similar to the array in FIG. 7 and can be used in a small aperture acoustic velocity sensor. A difference between the array of FIG. 8 and FIG. 7 is the rotation and layout of the sub-arrays. The particular layout of the array in FIG. 8 is advantageous for fitting the four sub-arrays in an approximately square surface of small area.

Figure 9:
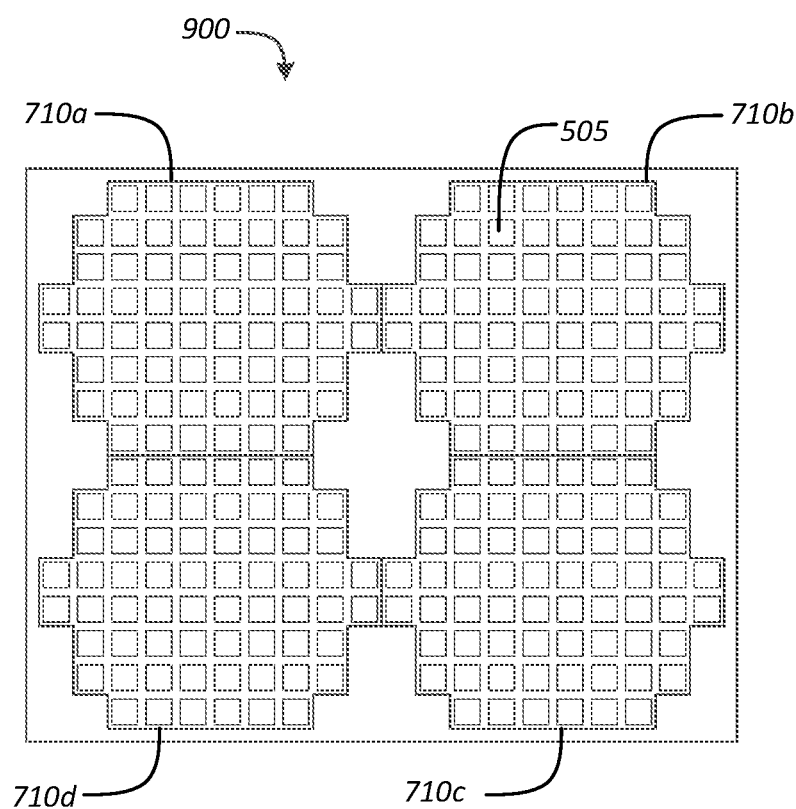
FIG. 9 is a diagram of a grid of four approximately hexagonal receive sub-arrays, aligned such that there is a hole in the center, that cover the full aperture of the transmit array of a small aperture acoustic velocity sensor according to an embodiment of the disclosed technology.

FIG. 9 is a diagram of a grid 900 of four identical receive sub-arrays 710a, 710b, 710c and 710d having approximately hexagonal apertures, aligned such that there is a hole in the center, that cover the full aperture of the transmit array of a small aperture acoustic velocity sensor according to an embodiment of the disclosed technology. The array of FIG. 9 is similar to the array in FIG. 8 and can be used in a small aperture acoustic velocity sensor. A difference between the array of FIG. 9 and FIG. 8 is the layout and the hole in the center of the sub-arrays. This layout can be beneficial in that the velocity processing algorithm could be simplified because the sub-arrays are oriented along perpendicular axes.

Figure 10:
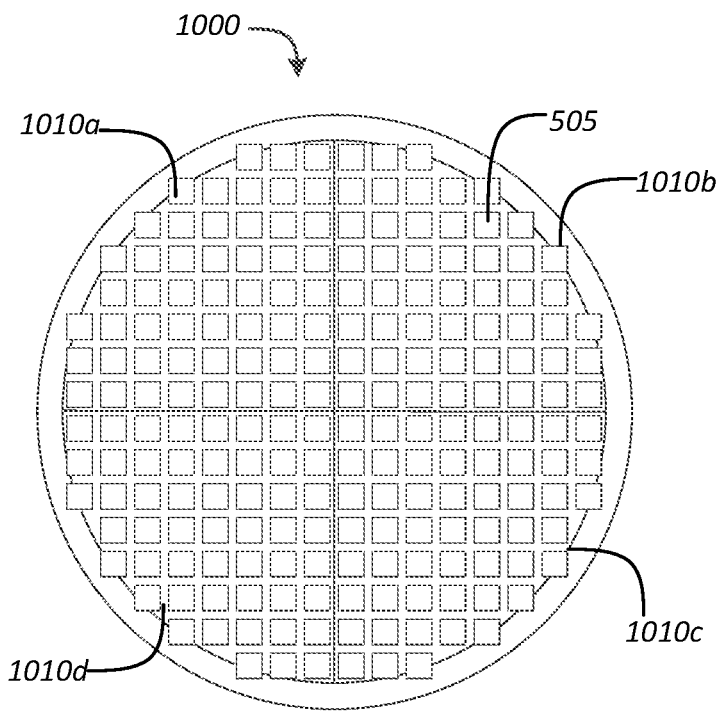
FIG. 10 is a diagram of a grid of four approximately quarter-circle receive sub-arrays that cover the full aperture of the transmit array of a small aperture acoustic velocity sensor according to an embodiment of the disclosed technology.

FIG. 10 is a diagram of a grid 1000 of four receive sub-arrays 1010a, 1010b, 1010c and 1010d having approximately quarter-circle-shaped apertures that cover the full circular aperture of the transmit array of a small aperture acoustic velocity sensor according to an embodiment of the disclosed technology. The array of FIG. 10 is similar to the array in FIG. 5 and can be used in a small aperture acoustic velocity sensor. A difference between the array of FIG. 10 and FIG. 5 is the quarter-circle shape of the sub-arrays. This particular shape is beneficial for fitting the four sub-arrays in a circular surface of the smallest possible area, but has the disadvantage that the sub-arrays are asymmetric and do not have identical orientations.

Figure 11:
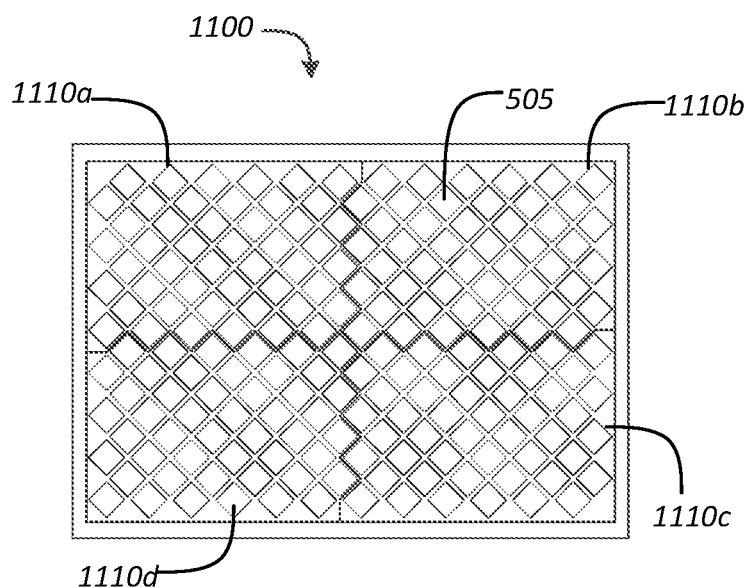
FIG. 11 is a diagram of a grid of four rectangular receive sub-arrays, composed of elements that are rotated by an amount, that cover the full aperture of the transmit array of a small aperture acoustic velocity sensor according to an embodiment of the disclosed technology.

FIG. 11 is a diagram of a grid 1100 of four rectangular receive sub-arrays 1110a, 1110b, 1110c and 110d, composed of elements 505 that are rotated by an amount, that cover the full aperture of the transmit array of a small aperture acoustic velocity sensor according to an embodiment of the disclosed technology. The array of FIG. 11 is similar to the array in FIG. 5 and can be used in a small aperture acoustic velocity sensor. A difference between the array of FIG. 11 and FIG. 5 is the rotation of the grid elements in the array of FIG. 11 along with the staves that connect elements having the same phase. Receive and transmit phasing is performed diagonally to form acoustic beams that are spatially oriented at an angle in azimuth from the outline of the sub-arrays. Diagonal acoustic beam forming has the advantage of tapering the aperture along the direction of the acoustic beam, leading to particularly low acoustic beam pattern response in the undesired direction of the opposite acoustic beam.

The arrays disclosed in FIG. 5 to FIG. 11 are composed of different number of sub-arrays, shapes, layouts, and elements of different rotations. There are many other possible array geometries that could be combinations of the disclosed arrays, alterations to the disclosed arrays, or other geometries that could be used in a small aperture acoustic velocity sensor. Certain advantages of the disclosed arrays were identified, but it is not possible to disclose every possible array variation and the corresponding advantage.

Figure 12:
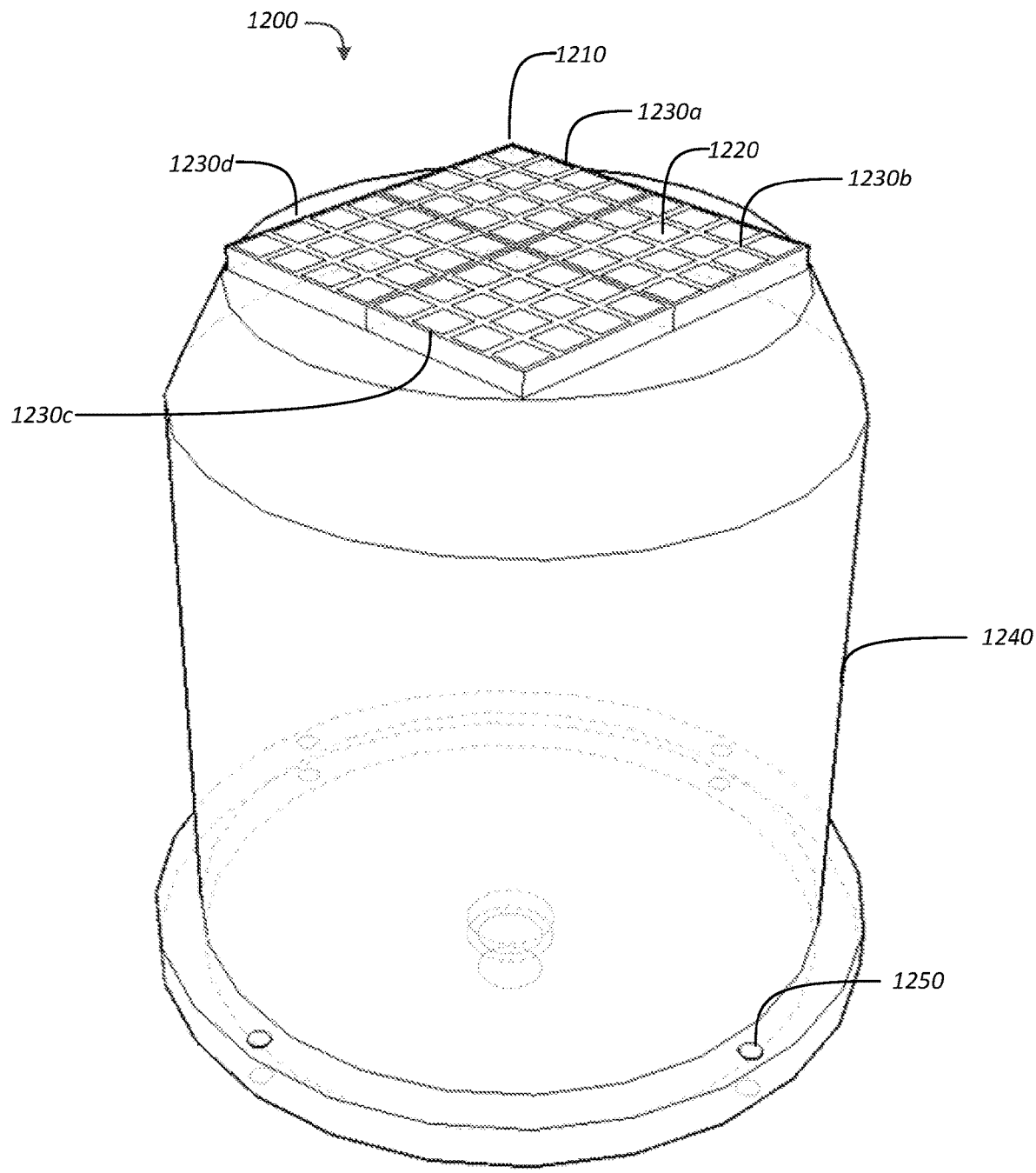
FIG. 12 is a diagram of a small aperture acoustic velocity sensor system composed of four rectangular sub-arrays, a waterproof housing, a mounting plate, and an end-cap electrical connector according to an embodiment of the disclosed technology.

FIG. 12 illustrates a perspective view of a small aperture acoustic velocity sensor 1200 according to certain embodiments. The small aperture acoustic velocity sensor 1200 consists of a pressure housing 1240 with mounting holes 1250 on the side away from the acoustic array 1210, an electrical connector, the array with four square sub-arrays 1230a, 1230b, 1230c and 1230d, and contains the electronics inside the pressure housing 1240. The arrays of this embodiment can be of any shape, size, configuration, orientation, and can contain any number of sub-arrays of elements 1220 of any shape, size, configuration, and orientation, such as the arrays illustrated in FIGS. 5-11.

Figure 13:
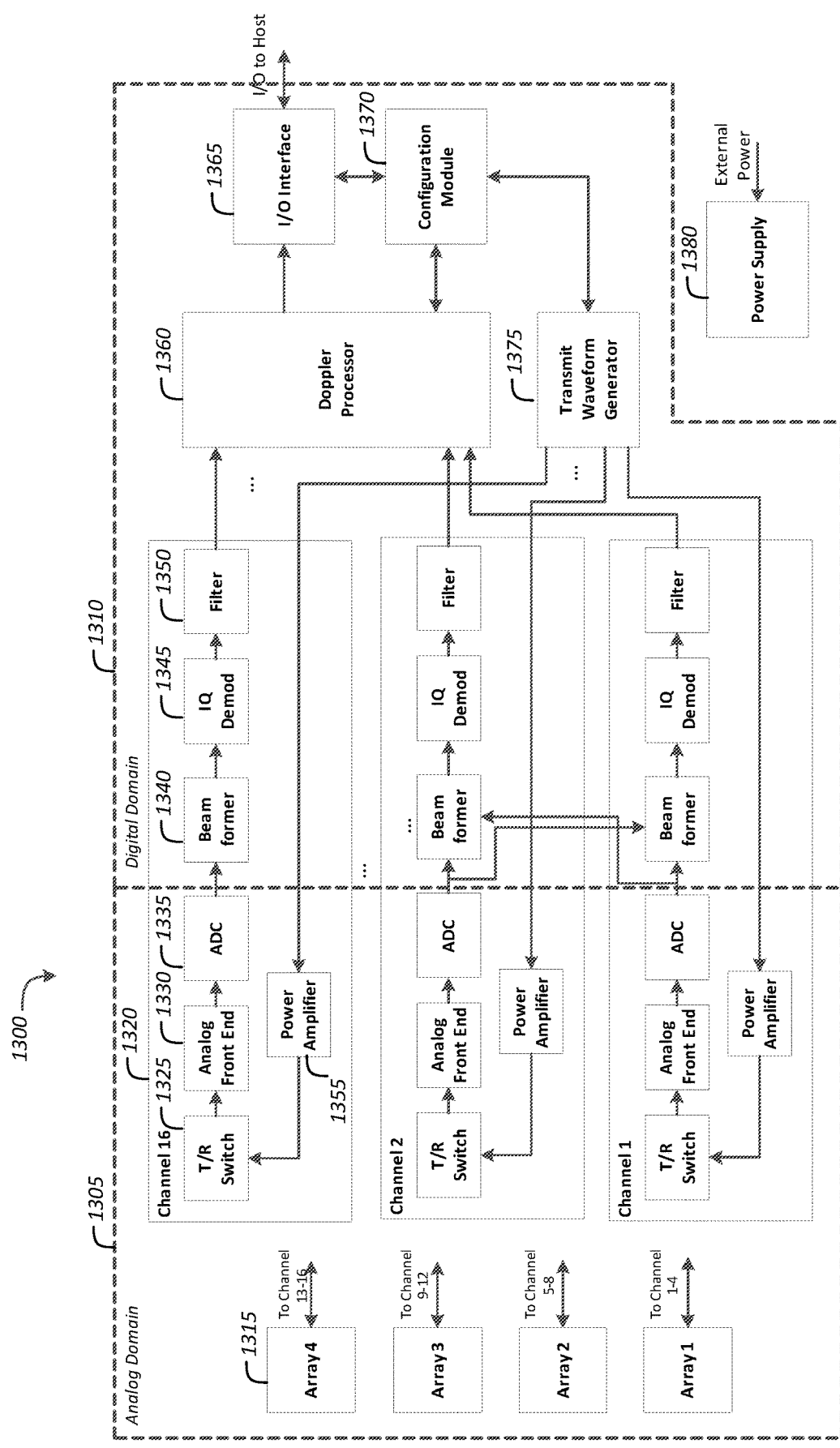
FIG. 13 is a block diagram of an exemplary embodiment of the electronics for a small aperture acoustic velocity sensor.

FIG. 13 is a block diagram of an exemplary embodiment of the electronics 1300 for a small aperture acoustic velocity sensor. There are alternative ways of configuring and partitioning the electronics of the small aperture acoustic velocity sensor that could achieve similar results. When pinging all acoustic beams simultaneously a total of 16 channels are required for dual axis interpolation, while 8 channels are sufficient for single-axis interpolation. Multiplexing of acoustic beams and/or arrays is possible to reduce the required number of electronics channels.

The implementation of the small aperture acoustic velocity sensor 1300 is divided up into two domains: an analog domain 1305 and a digital domain 1310. Each of the four sub-arrays 1315 is composed of rows and columns of piezoelectric transmit and receive elements, similar to a conventional Doppler velocity log. There are four pairs of wires for each array 1315 and they are connected to four of the channels 1320. A transmit receive (T/R) switch 1325 multiplexes between transmit and receive. In transmit mode a transmit waveform generator generates phase coded waveforms for each of the sub arrays 1315 and the output is amplified by a power amplifier 1355.

In receive mode the output of the T/R switch 1325 is connected to an analog front end block 1330 that can contain amplification stages, filters, and other analog components. In this embodiment, the output of the analog front end 1325 is digitized by an ADC 1335. Beamforming is performed in the digital domain by beam former 1340, where at least two channels are delayed in phase by different amounts and summed together. In-phase and quadrature (IQ) demodulation is performed by an IQ demodulator block 1345 and the signal is down-converted to baseband by multiplication by a complex exponential. The last stage of each channel contains a filter 1350 to filter out the unwanted parts of the frequency spectrum after demodulation. The outputs of the 16 channels are connected to a Doppler processor 1360, which processes the IQ data according to a process to, for example, compute velocity. Doppler processor 1360 can be a processor, an FPGA, or other computing circuitry. One version of the process that can be implemented in the Doppler processing block is provided in the flow chart described below.

An I/O interface 1365 connects the system to a host and passes configuration data to a configuration module. The I/O interface 1365 is bi-directional and outputs the Doppler results to the host processor (not shown), and performs configuration writes and reads to and from the configuration module 1370. A power supply 1380 powers the system and is shown in FIG. 13.

Figure 14:
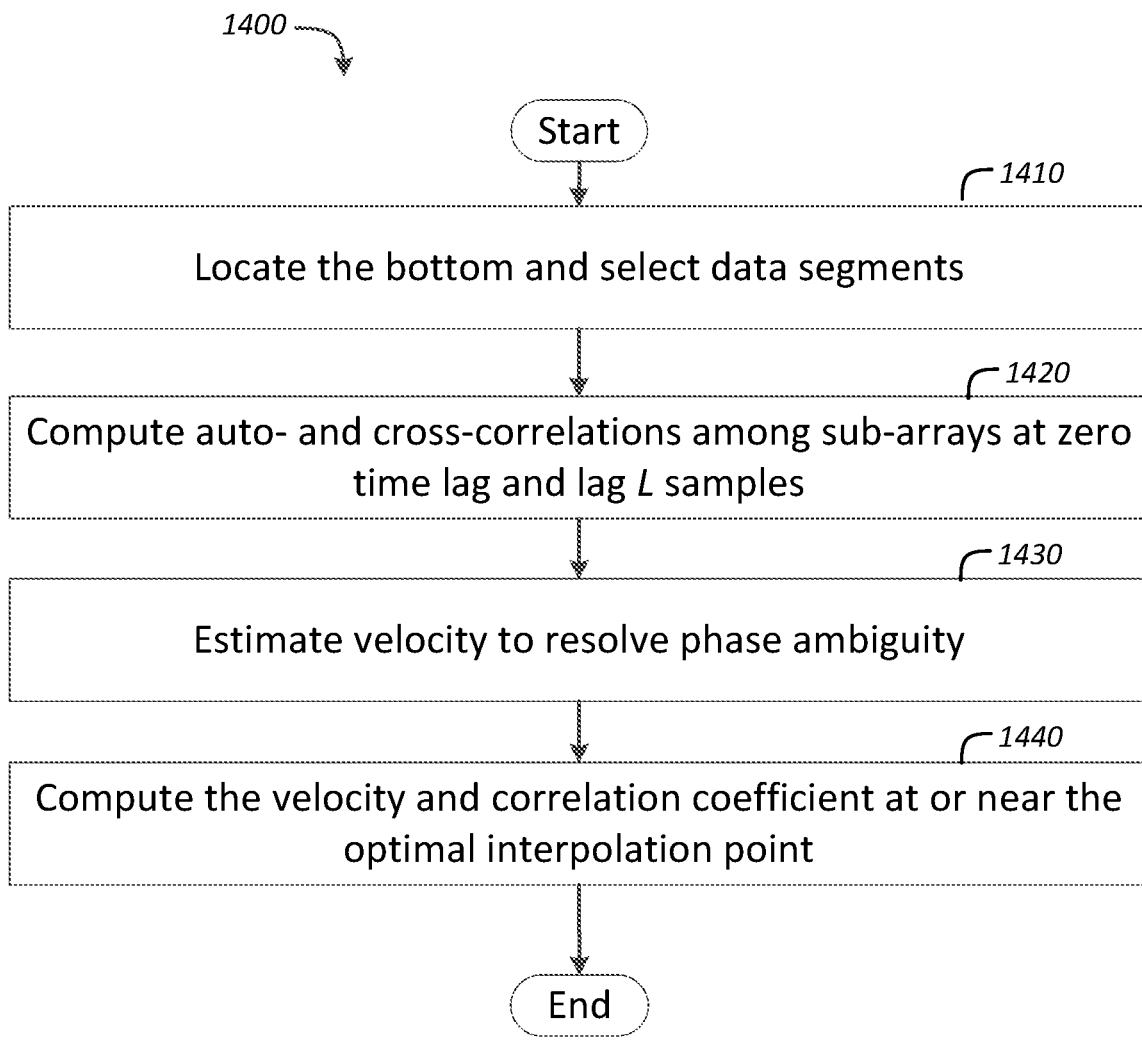
FIG. 14 is a flowchart of a process for measuring velocity according to an embodiment of the disclosed technology.

FIG. 14 is a flowchart of a process 1400 for measuring velocity according to an embodiment of the disclosed technology for the dual axis of interpolation embodiment that is composed of two or four sub-arrays. Each of the steps of the method 1400 can be performed by Doppler processor 1360, as illustrated in FIG. 13. For each acoustic beam the sub-arrays are used to interpolate to or near to the location of highest correlation. The interpolation will be described along only one axis for ease of understanding using two sub-arrays, but the method can be extended to incorporate, for example, four sub-arrays as well as interpolation in time.

In the description of the four sub-array DVL embodiment we assume that projection is set up in a manner similar to a conventional Doppler velocity log, where a transmitted pulse is composed of a multitude of sequences repeated at a time interval $T_L$. Each of the four sub-arrays then form Janus beams out of the plane of the arrays at an angle J from the axis perpendicular to the array. In the description of the interpolation along one axis, the two sub-arrays will be referred to as sub-arrays A and B, the aft sub-array being A and the forward one toward the bow being B.

Step 1. At block 1410, the method 1400 locates the bottom for each acoustic beam and selects the data segments to be used. Using signal intensity or other means, the method 1400 determines suitable data segments to be used for cross-correlation. For these segments, the echo should be dominated by the echo from the bottom, without transients that would cause differences in the population of scatterers over the time interval $T_L$. In other embodiments that use water volume scattering, time-gating and data segment selection would be used instead to place one or more depth cells at particular desired ranges.

Step 2. At block 1420, the method 1400 computes the auto- and cross-correlations among sub-arrays at zero time lag and at least one other lag at or near which the signal repeats. For each acoustic beam separately, the method 14X computes complex correlations among sub-arrays necessary to construct the magnitude and phase of the correlation coefficient as a function of interpolation parameters. Let $s_{Am}$ and $s_{Bm}$ be the $m^{th}$ complex phasor samples representing the demodulated signal measurements from a particular acoustic beam in the A and B sub-arrays and $\delta_{yn}$ be the acoustic beam-n interpolation weight parameter used to combine them to form the complex sample $s_i(y_v, t)$ by spatial interpolation along the y axis. It is often useful to combine the two measurements with a relative phase offset α, particularly if the distance D separating the centroids of sub-arrays A and B projected onto the interpolation axis is not an integer multiple of 2λ, or if slight steering of the acoustic beam centroid direction by a fraction of the beamwidth is desired. If we choose the interpolation parameter $\delta_{yn}$ to have the value 0 at the center position where both sub-arrays are weighted equally, −1 when the sample from sub-array A is selected, and 1 when B is selected, the linear interpolation formula must be equivalent to:

$$s_i(y_v=½\delta_{yn}D, t=mt_s) = ½(1-\delta_{yn})e^{y_u}s_{A,m} + ½(1+\delta_{yn})e^{y-u}s_{B,m} \quad (49)$$

$y_v$ is the interpolated centroid position along the forward axis in the vehicle frame relative to the physical centroid of the array, t is time and $t_s$ is the sample interval. Since the centroid follows the same linear weighting rule as the samples (assuming sub-arrays A and B match), by substituting the sub-array positions ±½ D into Eqn. 49 for the samples $s_{Bn}$ and $s_{An}$, respectively, we can see that the centroid position of the combined array is $y_v = ½ \delta_{yn} D$. Although symmetry is not strictly necessary, the preferred embodiment uses interpolation parameters of equal magnitude and opposite signs when cross-correlating sample pairs at spatial lag $d_y = \delta_{yn} D$.

$$4s_x(y_y, t)s_x^*(y_y + \delta_n D, t + T_L) = \quad (50)$$
$$\left((1+\delta_{yn})e^{\frac{1}{2}ia}s_{A,m} + (1-\delta_m)e^{-\frac{1}{2}ia}s_{A,(m+L)}^* + (1+\delta_m)e^{\frac{1}{2}ia}s_{B,(m+L)}^*\right) =$$
$$(1+\delta_{yn})^2 e^{ia}s_{A,m}s_{A,(m+L)}^* +$$
$$(1-\delta_{yn}^2)(s_{A,x}s_{A,(m+L)}^* + s_{B,x}s_{B,(m+L)}^*) + (1-\delta_{yn})^2 e^{-ia}s_{A,m}s_{A,(m+L)}^*$$

L is the lag in samples, making $T_L = L t_s$ and the asterisk means the complex conjugate. By accumulating the three cross-correlation terms in Eqn. 50 separately, the interpolation parameter $\delta_{yn}$ can be left as a free variable to be determined later in the velocity processing algorithm. The phase and correlation coefficient of the interpolated array are then related to the cross-correlations among sub-arrays by:

$$\phi(\delta_{yn}D, T_L) = \arg((1+\delta_{yn})^2 e^{ia}R_{AB,L} + \quad (51)$$
$$(1-\delta_{yn}^2)(R_{AA,L} + R_{BB,L}) + (1-\delta_{yn})^2 e^{-ia}R_{BA,L})$$

$$\rho(\delta_{yn}D, T_L) = \quad (52)$$
$$\frac{|(1+\delta_{yn})^2 e^{ia}R_{AB,L} + (1-\delta_{yn}^2)(R_{AA,L} + R_{BB,L}) + (1-\delta_{yn})^2 e^{-ia}R_{BA,L}|}{\sqrt{((1+\delta_{yn}^2)(R_{AA,0} + R_{BB,0}) + (1-\delta_{yn}^2)(e^{ia}R_{AB,0} + e^{-ia}R_{BA,0}))^2 - 4\delta_{yn}^2(R_{AA,0} - R_{BB,0})^2}}$$

The Rs are the various accumulated correlation pairs shown in Eqn. 50 at sample lags L and 0. In Eqn. 52, the correlation coefficient has been normalized by the geometric mean of the autocorrelations at zero time lag of the interpolated arrays having interpolation parameters $\delta_{yn}$ and $-\delta_{yn}$. Eqns. 51 and 52 are not actually executed until Step 4.

Step 3. At block 1430, the method 1400 estimates velocity to resolve phase ambiguity. The method 1430 finds an approximation for the velocity vector that is close enough to prevent ambiguity errors in the next step. There are many possible approaches to estimate the velocity a priori or from the data of the present ping or using some combination of present and past measurements. These include assuming that the velocity is zero, using the value from the previous measurement or a weighted average of previous measurements, using inertial sensors to estimate the change in velocity from the previous measurement, using a filtered pressure sensor signal to estimate the vertical velocity component, and using the disclosed algorithm for a shorter lag. If the initial velocity estimate is so unreliable that there is a significant chance of ambiguity error in the next step, then it is advisable to use an a posteriori method of ambiguity error detection, such as screening for large errors in the redundant velocity component when combining four acoustic beam-axis components into three orthogonal velocity components; or varying the lag from ping to ping; or using two or more different lags with data from the same ping. The method of ambiguity resolution disclosed here involves maximizing the correlation coefficient in each of the planes perpendicular to an acoustic beam, by finding for each acoustic beam the value of the interpolation parameter $\delta_n$ that maximizes the correlation coefficient of Eqn. 52. A number of search algorithms are available for such maximization problems. For the one-dimensional interpolation described here, the velocity estimates are:

$$v \cong -\frac{D}{8T_L}(\delta_{y1} + \delta_{y2} + \delta_{y3} + \delta_{y4}) \quad (53)$$

$$w \cong \frac{D}{4T_L}(\delta_{y4} - \delta_{y3})\cot J_y \quad (54)$$

Stochastic variation in the curvature of the correlation coefficient with the interpolation parameter near the peak occasionally makes the quality of the estimate from any one acoustic beam somewhat erratic, but because the acoustic beams are largely independent, the average given by Eqn. 53, or a weighted version of it, should be useful as a starting point for v in the next step. The estimate for the vertical velocity component w given in Eqn. 54 by the difference between the peak interpolation parameters for two acoustic beams may be erratic somewhat more often than the v estimate. Depending upon the circumstances, averaging and screening with other methods of ambiguity resolution may be useful for ensuring a reliable starting value for all velocity components.

Step 4. At block 1440, the method 1400 computes the velocity vector and correlation coefficient at or near the optimal interpolation point. The method 1400 computes the velocity vector at a displacement point consistent with the velocity. A few iterations may be needed to ensure consistency. The displacement point is initially computed assuming the velocity vector determined in the previous step and using a version of Eqns. 25-29:

$$\delta_{x1} = -2\frac{T_L}{D}(u - w\tan J_x) \quad (55)$$

$$\delta_{x2} = -2\frac{T_L}{D}(u + w\tan J_x) \quad (56)$$

$$\delta_{x3} = \delta_{x4} = -2\frac{T_L}{D}u \quad (57)$$

$$\delta_{y1} = \delta_{y2} = -2\frac{T_L}{D}v \quad (58)$$

$$\delta_{y3} = -2\frac{T_L}{D}(v + w\tan J_y) \quad (59)$$

$$\delta_{y4} = -2\frac{T_L}{D}(v - w\tan J_y) \quad (60)$$

(For the embodiment using one-dimensional interpolation considered above, only Eqns. 58-60 would be used.) Using the interpolation parameters for each acoustic beam, the acoustic beam phases can be calculated using Eqn. 51 or its two-dimensional equivalent. The velocity components can then be calculated from the acoustic beam phases. For the embodiment using one-dimensional interpolation, we can use an ambiguity-resolving inversion of Eqns. 45-48, such as:

$$u \leftarrow \frac{U_a}{\sin J_x}\left(\frac{\phi_2 - \phi_1}{2\pi} + \text{round}\left(\frac{\sin J_x}{U_a}u - \frac{\phi_2 - \phi_1}{2\pi}\right)\right) \quad (61)$$

$$v \leftarrow \frac{U_a}{\sin J_0}\left(\frac{\phi_3 - \phi_4}{2\pi} + \text{round}\left(\frac{\sin J_0}{U_a}v - \frac{\phi_3 - \phi_4}{2\pi}\right)\right) \quad (62)$$

$$w \leftarrow \frac{U_a}{\cos J_x + \sec J_y - \tan J_y \sin J_0} \times \left(-\frac{\phi_1 + \phi_2 + \phi_3 + \phi_4}{2\pi} + \text{round}\right. \quad (63)$$
$$\left.\left(\frac{\cos J_x + \sec J_y - \tan J_y \sin J_0}{U_a}w + \frac{\phi_1 + \phi_2 + \phi_3 + \phi_4}{2\pi}\right)\right)$$

$U_a = \frac{3}{4}\lambda/T_L$ is the π-phase radial ambiguity velocity, the round function finds the nearest integer to its argument, and the leftward arrow symbol indicates assignment of the right-hand side value to the variable on the left-hand side, updating that variable after it is used in the expression on the right-hand side. Other weightings are possible for w besides that given by Eqn. 63. For the embodiment using two-dimensional interpolation, on the other hand, we can use an inversion of Eqns. 41-44, such as:

$$u \leftarrow \frac{U_a}{\sin J_0}\left(\frac{\phi_2 - \phi_1}{2\pi} + \text{round}\left(\frac{\sin J_0}{U_a}u - \frac{\phi_2 - \phi_1}{2\pi}\right)\right) \quad (64)$$

$$v \leftarrow \frac{U_a}{\sin J_0}\left(\frac{\phi_3 - \phi_4}{2\pi} + \text{round}\left(\frac{\sin J_0}{U_a}v - \frac{\phi_3 - \phi_4}{2\pi}\right)\right) \quad (65)$$

$$w \leftarrow \quad (66)$$
$$\frac{U_a}{\sec J_x + \sec J_y - (\tan J_x + \tan J_y)\sin J_0} \times \left(-\frac{\phi_1 + \phi_2 + \phi_3 + \phi_4}{2\pi} + \right.$$
$$\left.\text{round}\left(\frac{\sec J_x + \sec J_y - (\tan J_x + \tan J_y)\sin J_0}{U_a}w + \frac{\phi_1 + \phi_2 + \phi_3 + \phi_4}{2\pi}\right)\right)$$

Other weightings are possible for w besides that given by Eqn. 66. The Step 4 sequence of operations can be iterated until the velocity components stop changing. There are several methods available to speed up convergence, but convergence is rapid simply with iteration alone. The final correlation coefficient for each acoustic beam can be computed after convergence using Eqn. 52 or its two-dimensional equivalent.

Figure 15:
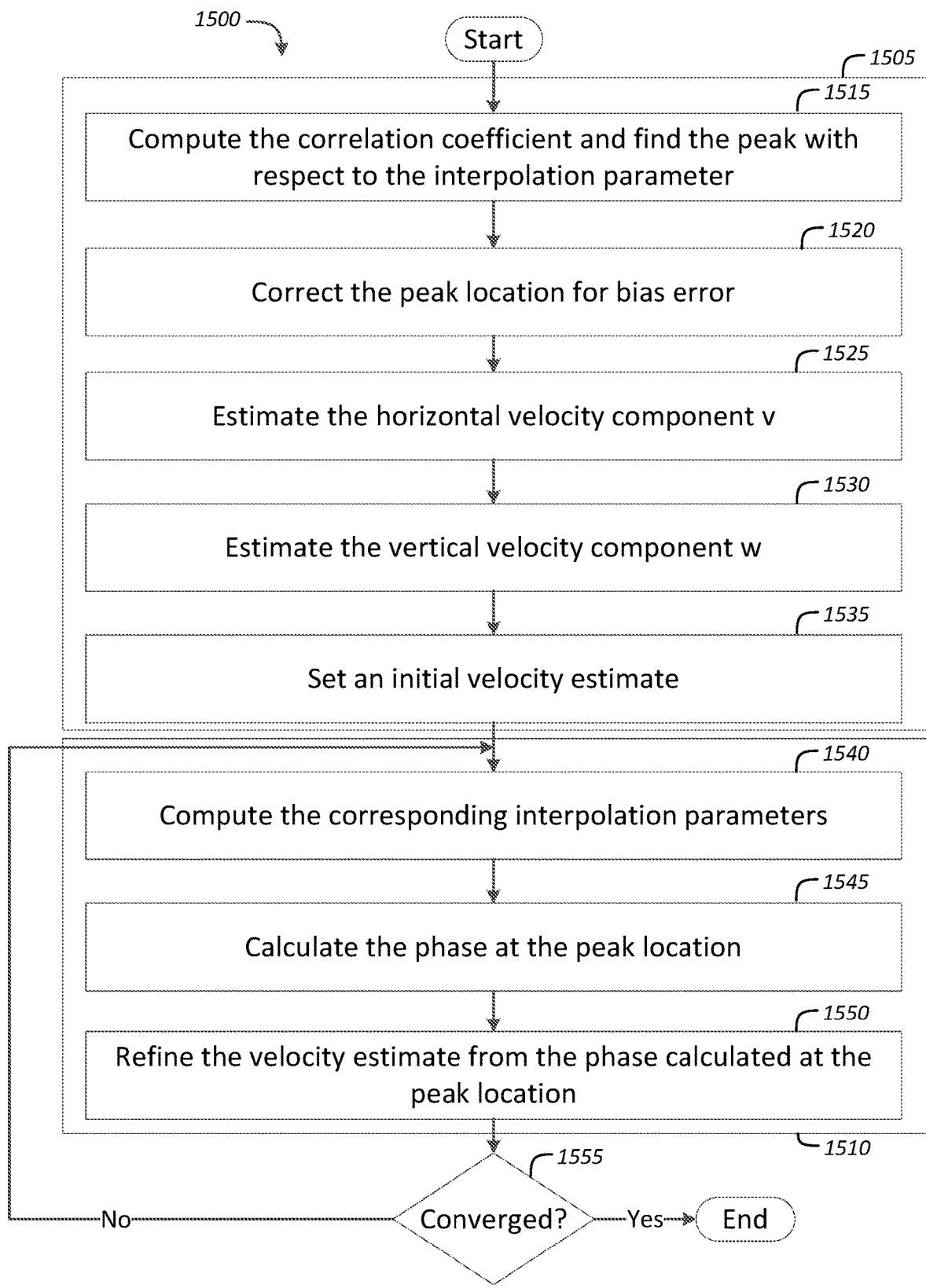
FIG. 15 is a flowchart of a process for the last two steps of FIG. 14 in more detail for the particular case of a single interpolation dimension aligned with one beam pair, for ambiguity resolution and to measure velocity according to an embodiment of the disclosed technology.

FIG. 15 is a flowchart of a process for the last two steps of FIG. 14 in more detail for the particular case of a single interpolation dimension aligned with one beam pair, for ambiguity resolution and to measure velocity according to an embodiment of the disclosed technology. In the description of four sub-array embodiments, as illustrated in FIG. 5, 7, 8, 9, 11 or 12, we can assume that transmit is set up in a manner similar to a conventional Doppler velocity log, where a transmit pulse is composed of a multitude of repeated sequences separated by a time lag $T_L$. Each of the four sub-arrays then form Janus beams out of the plane of the arrays at an angle J from the axis perpendicular to the array. In the description of the interpolation along one axis the two sub-arrays will be referred to as the left and right sub-arrays. Each of the steps of the method 1500 can be performed by Doppler processor 1360, as illustrated in FIG. 13.

At block 1505, the method 1500 estimates velocity to resolve phase ambiguity, corresponding to block 1430 of the method 1400, as described above with respect to FIG. 14, for an embodiment having a single interpolation axis. Block 1505 includes blocks 1515, 1520, 1525, 1530 and 1535, as described below. At block 1510, the method 1500 computes the velocity and correlation coefficient at or near an optimal interpolation point, corresponding to block 1440 of the method 1400, as described above with respect to FIG. 14, for an embodiment having a single interpolation axis. Block 1510 includes blocks 1540, 1545, and 1550, as described below.

At block 1515, the method 1500 computes that correlation coefficient using Eqn. 52 and finds the approximate location of the peak of the correlation coefficient with respect to variation of the interpolation parameter $\gamma_{yn}$ for each acoustic beam, by finding the largest of a set of values calculated over a set of discrete values. The peak locations are assigned to the variables $\delta_{y1,p}$, $\delta_{y2,p}$, $\delta_{y3,p}$, and $\delta_{y4,p}$.

At block 1520, the method 1500 corrects the peak locations for bias error using a polynomial function of the peak location itself according to:

$$\delta_{yn,p} \leftarrow a\delta^2_{yn,p} + b\delta_{yn,p} + c \quad (67)$$

where a, b, and c are the coefficients of the bias correction.

At block 1525, the method 1500 estimates the horizontal velocity component v using Eqn. 53.

At block 1530, the method 1500 estimates the vertical velocity component w using Eqn. 54, perhaps augmented by some other ambiguity resolution method.

At block 1535, the method 1500 selects the velocity components calculated at blocks 1525 and 1530 to use as starting values of the velocity components for the next block 1540 that are not subject to ambiguity errors.

At block 1540, the method 1500 computes the interpolation parameters for each acoustic beam corresponding to the latest estimates of velocity components v and w using Eqns. 58-60. On the first iteration, these estimates come from block 1535. On later iterations, they come from block 1550.

At block 1545, the method 1500 computes the phase for each acoustic beam using Eqn. 51 with the interpolation parameters calculated at block 1540.

At block 1550, the method 1500 uses the latest velocity components from block 1530 or block 1550 and the phases from block 1545 to compute improved velocity estimates consistent with the phase measurements using Eqns. 61-63. The lateral velocity component u need not be computed using Eqn. 61 until iteration is complete because it is not needed in the iteration loop. In Eqn. 61, an estimate of JA can be substituted for $J_x$.

Branch 1555 terminates the iteration of block 1510 when some measure of convergence is satisfied or after a fixed number of iterations.

Figure 16:
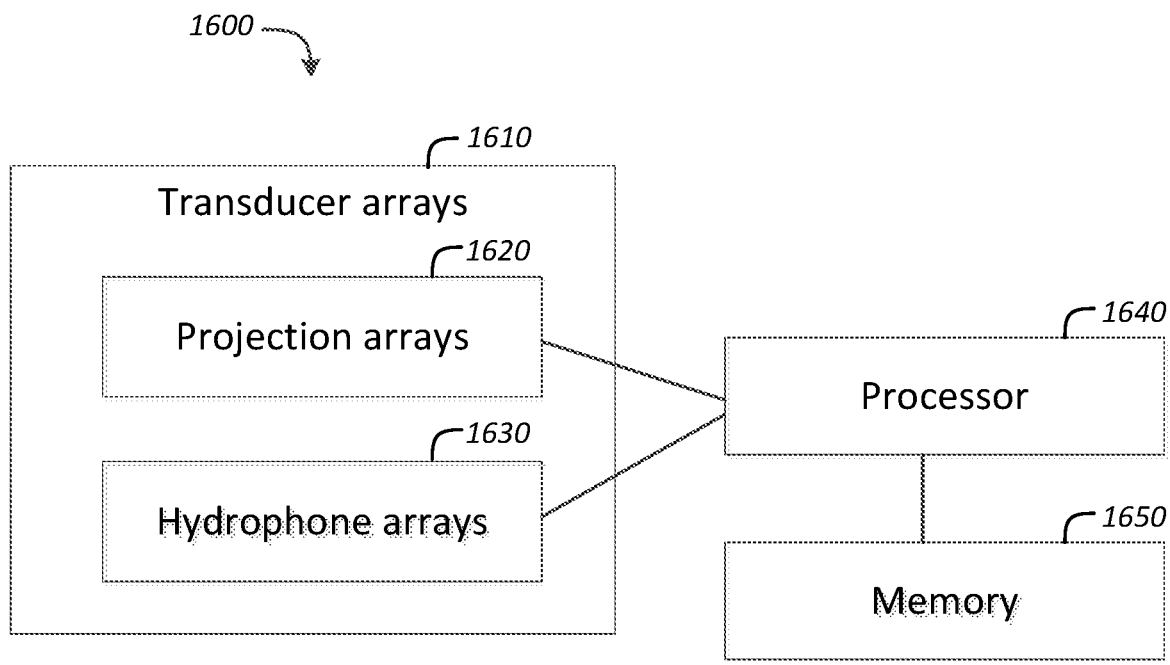
FIG. 16 is a block diagram of a small aperture acoustic velocity sensor, according to an embodiment of the disclosed technology.

FIG. 16 is a block diagram of a small aperture acoustic velocity sensor 1600, according to an embodiment of the disclosed technology. The sensor includes a plurality of transducer arrays 1610 that spatially modulate and project a plurality of acoustic beams in different directions. The transducer arrays 1610 receive and spatially demodulate a spatiotemporal pattern of acoustic signals corresponding to echoes of the projected acoustic beams from a plurality of scatterers in the water while preserving the relative phase relationship of the backscattered acoustic signals. The transducer arrays 1610 may include elements of electronics 1300, as described above with respect to FIG. 13, including arrays 1315 and channel 1320 components, such as T/R switch 1325, analog front end 1330, ADC 1335, beamformer 1340, IQ demod 1345 and filter 1350.

In certain embodiments, the transducer arrays 1610 include separate projection arrays 1620 and hydrophone arrays 1630. For these embodiments, the projection arrays 1620 spatially modulate and project a plurality of acoustic beams in different directions. For these embodiments, the hydrophone arrays 1630 receive and spatially demodulate a spatiotemporal pattern of acoustic signals corresponding to echoes of the projected acoustic beams from a plurality of scatterers while preserving the relative phase relationship of the backscattered acoustic signals.

The small aperture acoustic velocity sensor 1600 includes a processor 1640 configured to separate received acoustic signals backscattered from different projected acoustic beams, linearly combine the received acoustic signals over a portion of the hydrophone arrays, and measure vehicle velocity and/or water velocity components. The processor 1640 may include the Doppler process 1360 described above with respect to FIG. 13. The small aperture acoustic velocity sensor 1600 includes memory 1650 configured to store processing instructions, control data, acoustic data, and/or intermediate or final results of the calculations as described above with respect to FIGS. 14 and 15.

Figure 17:
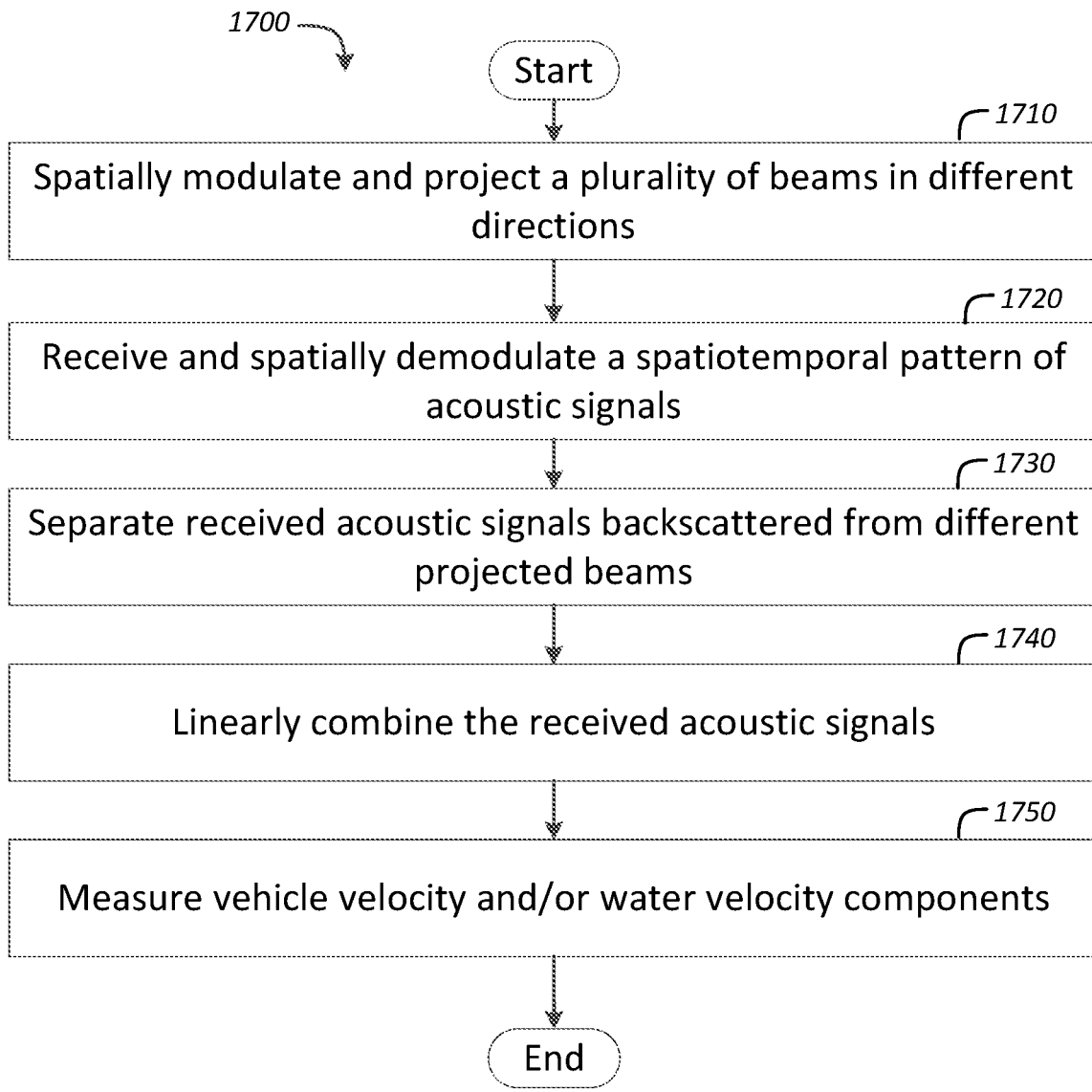
FIG. 17 is a flowchart of a process for measuring velocity according to an embodiment of the disclosed technology.

FIG. 17 is a flowchart of a process 1700 for measuring velocity according to an embodiment of the disclosed technology. At block 1710, the method 1700 spatially modulates and projects a plurality of acoustic beams from a plurality of sub-arrays in different directions. In an embodiment, at least some of the functionality of block 1710 may be performed by the transducer arrays 1610 of FIG. 16, the projection arrays 1620 of FIG. 16, and/or some or all of Array1-Array4 1315 of FIG. 13.

At block 1720, the method 1700 receives and spatially demodulates a spatiotemporal pattern of acoustic signal corresponding to echoes of the projected acoustic beams from a plurality of scatterers while preserving the relative phase relationship of the back scattered acoustic signals from the scatterers. In an embodiment, at least some of the functionality of block 1720 may be performed by the transducer arrays 1610 of FIG. 16, the hydrophone arrays 1630 of FIG. 16, and/or Array1-Array4 1315 of FIG. 13.

At block 1730, the method 1700 separates the received acoustic signals backscattered from different projected acoustic beams. In an embodiment, at least some of the functionality of block 1730 may be performed by the processor 1640 of FIG. 16, and/or the Doppler processor 1360 of FIG. 13.

At block 1740, the method 1700 linearly combines the received acoustic signals. In an embodiment, at least some of the functionality of block 1740 may be performed by the processor 1640 of FIG. 16, and/or the Doppler processor 1360 of FIG. 13.

At block 1750, the method 1700 measures vehicle velocity and/or water velocity components, as described above with respect to FIGS. 14 and 15. In an embodiment, at least some of the functionality of block 1750 may be performed by the processor 1640 of FIG. 16, and/or the Doppler processor 1360 of FIG. 13.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

What is claimed is:

1. An underwater active sonar system, comprising:
a plurality of transducer sub-arrays configured to spatially modulate and project a plurality of acoustic beams in different directions, receive and spatially demodulate a spatiotemporal pattern of backscattered acoustic signals corresponding to echoes of the projected acoustic beams from a plurality of scatterers while preserving the relative phase relationship of the backscattered acoustic signals; and
a processor configured to separate received backscattered acoustic signals backscattered from different ones of the projected acoustic beams, linearly combine the acoustic signals received over each of the transducer sub-arrays, and measure vehicle velocity and/or water velocity components in response to the linearly combined acoustic signals,
wherein each transducer sub-array includes a plurality of array elements, and wherein the plurality of transducer sub-arrays are connected to a plurality of channels for the linearly combining, and
wherein the processor is configured to use a phase of a cross-correlation function at or near a lag equal to a Doppler-shifted pulse repetition interval in multiple acoustic beams to measure velocity.

2. The system of claim 1, wherein the processor is configured to apply beamforming processing to separate received acoustic signals.

3. The system of claim 1, wherein the processor is configured to fit a parametric model to an amplitude and phase of an interference pattern of the received acoustic signals.

4. The system of claim 1, wherein the processor is configured to measure vehicle velocity based on backscattering sound off a bottom surface of a body of water.

5. The system of claim 1, wherein the processor is configured to measure vehicle velocity and/or water velocity by processing the backscattered acoustic signals received from volume scatterers within a body of water.

6. The system of claim 1, wherein at least one of the transducer sub-arrays projects a gated monotone pulse to produce a narrowband signal.

7. The system of claim 1, wherein at least one of the transducer sub-arrays projects one or more repetitions of a phase-coded or chirped signal to produce a wideband signal.

8. The system of claim 1, wherein the processor is configured to measure vehicle velocity and/or water velocity components by at least interpolating received acoustic signals, in at least one of time and space, to approximate bistatic invariance geometry, and comparing the interpolated received acoustic signals in pairs at or near the Doppler-shifted pulse repetition interval.

9. The system of claim 1, wherein each of the transducer sub-arrays comprises at least one of a phased array, an array of phased arrays, a multichannel array, a blazed array, an array of blazed arrays, and a set of piston transducers.

10. The system of claim 1, wherein a shape of each of the transducer sub-arrays is approximately polygonal, a section of a circle, or a section of an oval.

11. The system of claim 1, wherein measuring vehicle velocity and/or water velocity components in response to the linearly combined signals includes combining correlation phase information from the plurality of acoustic beams.

12. The system of claim 1, wherein a total number of channels in the system is in a range between four and sixteen channels.

13. The system of claim 1, wherein each sub-array of the transducer sub-arrays abuts at least one other sub-array of the transducer sub-arrays.

14. The system of claim 1, wherein the system comprises at least four channels for each of the sub-arrays.

15. An underwater active sonar system, comprising:
a plurality of transducer sub-arrays configured to spatially modulate and project a plurality of acoustic beams in different directions, receive and spatially demodulate a spatiotemporal pattern of acoustic signals corresponding to echoes of the projected acoustic beams from a plurality of scatterers while preserving the relative phase relationship of the backscattered acoustic signals; and
a processor configured to separate received acoustic signals backscattered from different ones of the projected acoustic beams, linearly combine the acoustic signals received over each of the transducer sub-arrays, and measure vehicle velocity and/or water velocity components in response to the linearly combined acoustic signals,
wherein each sub-array includes a plurality of array elements, and wherein the plurality of sub-arrays are connected to a plurality of channels for the linearly combining, wherein the processor is configured to interpolate received acoustic signals, in at least one of time and space, to approximate bistatic invariance geometry, and to compare the interpolated received acoustic signals in pairs at or near a Doppler-shifted pulse repetition interval.

16. An underwater active sonar system, comprising:
a plurality of parametric array projectors configured to project a plurality of acoustic beams in different directions;
a plurality of hydrophone sub-arrays configured to receive and spatially demodulate a spatiotemporal pattern of backscattered acoustic signals corresponding to echoes of the projected acoustic beams from a plurality of scatterers in the water while preserving the relative phase relationship of the backscattered acoustic signals; and
a processor configured to separate received backscattered acoustic signals backscattered from different ones of the projected acoustic beams, linearly combine the acoustic signals received over each of the hydrophone sub-arrays, and measure vehicle velocity and/or water velocity components based on the linearly combined acoustic signals,
wherein the parametric array projectors project frequencies that interact non-linearly, and
wherein the processor is configured to use a phase of a cross-correlation function at or near a lag equal to a Doppler-shifted pulse repetition interval in multiple acoustic beams to measure velocity.

17. The system of claim 16, wherein measuring vehicle velocity and/or water velocity components based on the linearly combined acoustic signals includes combining correlation phase information from the plurality of acoustic beams.

18. The system of claim 16, wherein the processor is configured to apply beamforming processing to separate received acoustic signals.

19. The system of claim 16, wherein the processor is configured to fit a parametric model to an amplitude and phase of an interference pattern of the received acoustic signals.

20. The system of claim 16, wherein the processor is configured to measure vehicle velocity based on backscattering sound off a bottom surface of a body of water.

21. The system of claim 16, wherein the processor is configured to measure vehicle velocity and/or water velocity by processing backscattered acoustic signals received from volume scatterers within a body of water.

22. The system of claim 16, wherein the processor is configured to measure vehicle velocity and/or water velocity components by at least interpolating received acoustic signals, in at least one of time and space, to approximate bistatic invariance geometry, and comparing the interpolated received acoustic signals in pairs at or near the Doppler-shifted pulse repetition interval.

* * * * *

UNITED STATES PATENT AND TRADEMARK OFFICE
CERTIFICATE OF CORRECTION

PATENT NO. : 11,879,971 B2
APPLICATION NO. : 17/131033
DATED : January 23, 2024
INVENTOR(S) : Blair H. Brumley Page 1 of 2

It is certified that error appears in the above-identified patent and that said Letters Patent is hereby corrected as shown below:

In the Specification

In Column 8, Line 14, delete "$t_{RX2}$" and insert --$t_{TX2}$--.

In Column 9, Line 21, delete "Ti." and insert --$T_L$.--.

In Column 10, Line 13, delete "30" and insert --30°--.

In Column 11, Line 12 (Approx.), delete "= ½λ," and insert --= $^1/_4$λ,--.

In Column 11, Line 64, delete "=$d_1$-$d_{x2}$, α$d_{y12}$" and insert --= $d_{x1}$ – $d_{x2}$, Δ$d_{y12}$--.

In Column 15, Line 8-9, delete "$-\frac{\pi}{U_a} i \sin J_x$" and insert -- $-\frac{\pi}{U_a} u \sin J_x$ --.

In Column 15, Line 52, delete "510a." and insert --510a, 510b, 510c--.

In Column 15, Line 52, delete "510 and" and insert --510c and--.

In Column 15, Line 55, delete "subarray" and insert --sub-array--.

In Column 16, Line 5, delete "drill" and insert --drift--.

In Column 17, Line 12, delete "110d," and insert --1110d,--.

In Column 18, Line 67, delete "14X" and insert --1400--.

In Column 21, Line 38, delete "¾λ/$T_L$" and insert --$^1/_4$ λ/$T_L$--.

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,879,971 B2

In Column 22, Line 36, delete "$\gamma_{yn}$" and insert --$\delta_{yn}$--.

In Column 23, Line 2, delete "JA" and insert --$J_y$--.